(12) United States Patent
Tamura et al.

(10) Patent No.: US 7,283,601 B2
(45) Date of Patent: Oct. 16, 2007

(54) TIMING SIGNAL GENERATING SYSTEM AND RECEIVING CIRCUIT FOR TRANSMITTING SIGNALS AT HIGH SPEED WITH LESS CIRCUITRY

(75) Inventors: Hirotaka Tamura, Kawasaki (JP); Masaya Kibune, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 459 days.

(21) Appl. No.: 10/077,875

(22) Filed: Feb. 20, 2002

(65) Prior Publication Data

US 2002/0196889 A1   Dec. 26, 2002

(30) Foreign Application Priority Data

Jun. 22, 2001   (JP)   ............................. 2001-189901

(51) Int. Cl.
*H03D 3/24*   (2006.01)
(52) U.S. Cl. ...................... 375/373; 375/354; 375/371; 714/12
(58) Field of Classification Search ................ 327/105, 327/149, 156, 158, 276; 375/354, 371, 373; 714/12

See application file for complete search history.

(56) References Cited

U.S. PATENT DOCUMENTS

| | | | | |
|---|---|---|---|---|
| 5,479,457 A | * | 12/1995 | Waters | ........................ 375/372 |
| 5,613,235 A | * | 3/1997 | Kivari et al. | ................ 455/574 |
| 5,731,723 A | * | 3/1998 | Chen | ........................... 327/157 |
| 6,148,052 A | * | 11/2000 | Bogdan | ........................ 375/375 |
| 6,292,040 B1 | * | 9/2001 | Iwamoto et al. | ............. 327/158 |
| 6,606,351 B1 | * | 8/2003 | Dapper et al. | ............... 375/222 |
| 2002/0196885 A1 | * | 12/2002 | Kim et al. | .................... 375/357 |
| 2005/0231291 A1 | * | 10/2005 | Dally et al. | .................... 331/16 |

* cited by examiner

*Primary Examiner*—David C. Payne
*Assistant Examiner*—Erin M. File
(74) *Attorney, Agent, or Firm*—Arent Fox, LLP

(57) ABSTRACT

A timing signal generating system has a clock signal generating circuit, a synchronizing circuit, a phase code recognizing circuit, and a calibration circuit. The clock signal generating circuit generates at least one first clock signal upon receipt of at least one reference clock signal by controlling an output phase thereof with a digital code signal. The synchronizing circuit hands over signals between a group of circuits operated by the first clock signal and an internal circuit operated by a second clock signal. The phase code recognizing circuit recognizes a phase code when the phases of the first clock signal and of the second clock signal are in a particular relationship. The calibration circuit calibrates a relationship between a value of the recognized phase code and a phase difference between the first and second clock signals. The synchronizing circuit is controlled by using phase code data calibrated by the calibration circuit.

25 Claims, 18 Drawing Sheets

Fig.13

| U | D | b2 | b0 |
|---|---|----|----|
| 0 | 0 | 0  | 0  |
| 1 | 0 | 0  | 1  |
| 0 | 1 | 1  | 1  |

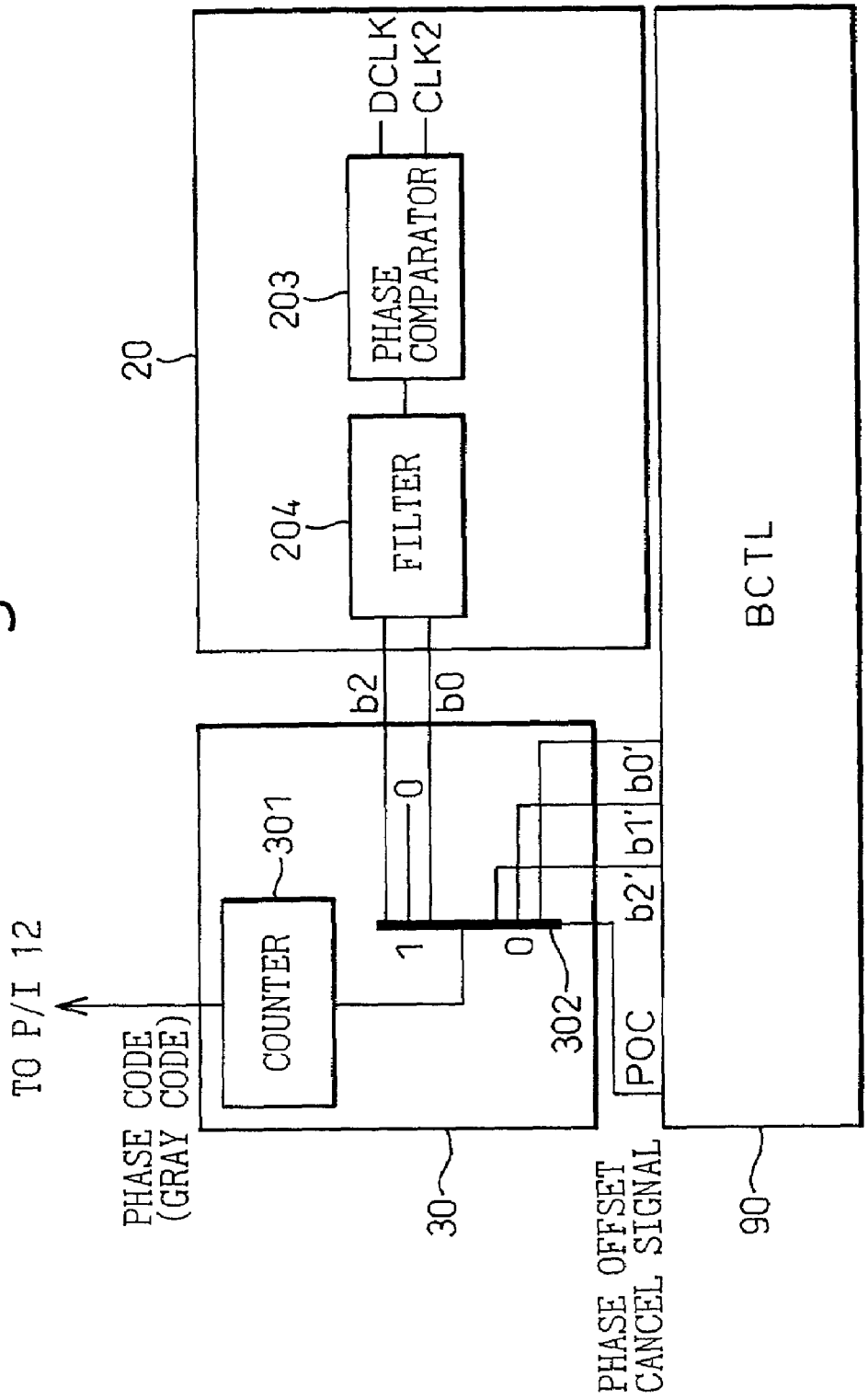

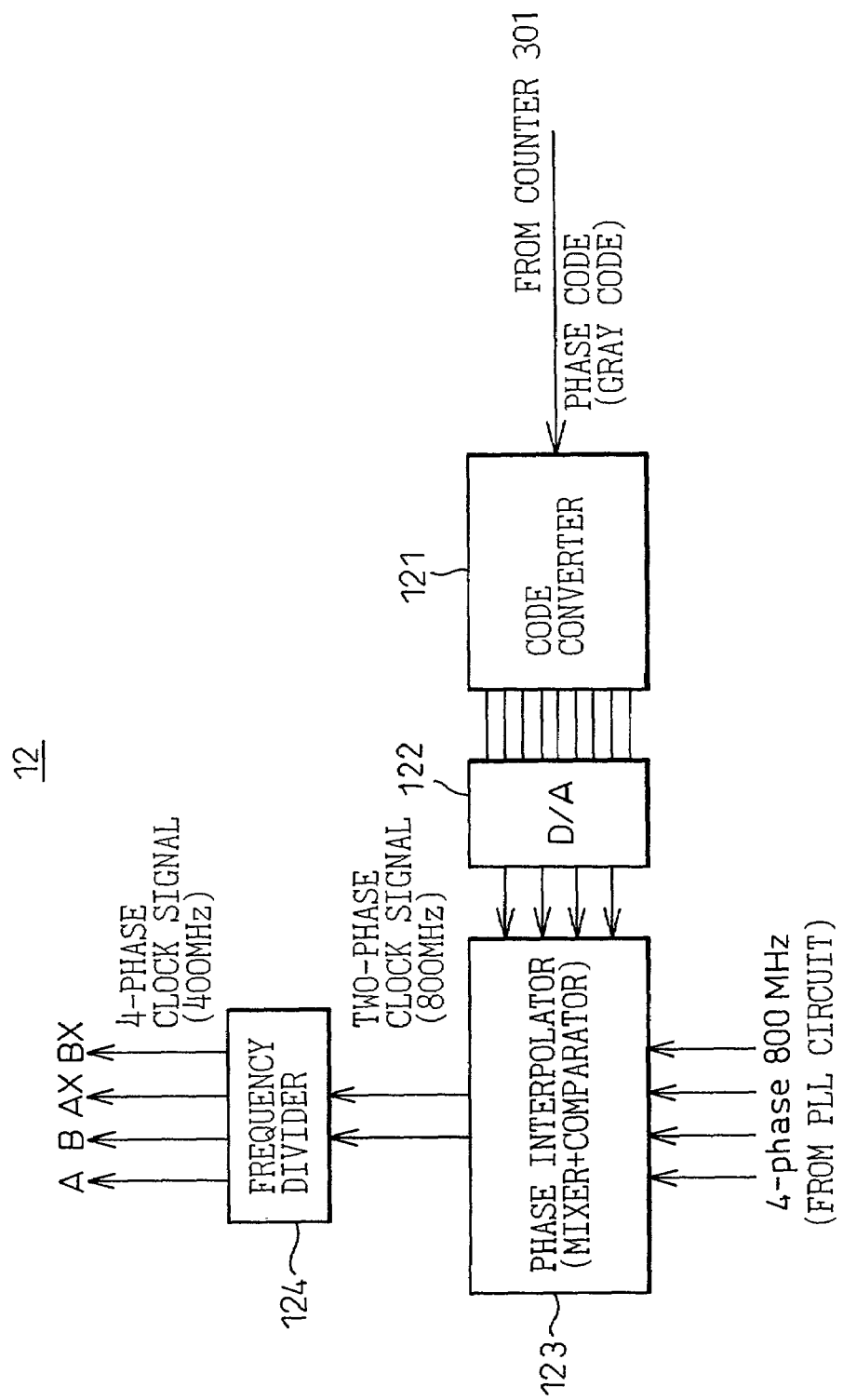

TIMING SIGNAL GENERATING SYSTEM AND RECEIVING CIRCUIT FOR TRANSMITTING SIGNALS AT HIGH SPEED WITH LESS CIRCUITRY

BACKGROUND OF THE INVENTION

1. Field of the Invention

The present invention relates to a technology for transmitting signals among a plurality of large scale integration ("LSI") chips, among a plurality of elements in a chip or among a plurality of circuit blocks, or for transmitting signals, at high speed, among a plurality of boards or among a plurality of housings. More particularly, the present invention relates to a timing signal generating system, for transmitting signals at high speed, and to a receiving circuit.

2. Description of the Related Art

Recently, the performance of components used in computers and other information processing apparatuses has been greatly improved. In particular, dramatic improvements have been made, for example, in the performance of processors and semiconductor memory devices such as SRAMs (Static Random Access Memories) and DRAMs (Dynamic Random Access Memories). The improvements in the performance of semiconductor memory devices, processors, and the like have come to the point where system performance cannot be improved further unless the speed of signal transmission between components or elements is increased.

Specifically, the speed of signal transmission between, for example, a main storage unit such as DRAM and a processor (between LSIs) is hindering the effort for improving the performance of the computer as a whole. Besides, it is becoming necessary to increase the speed of signal transmission not only between the housing and the board (printed wiring board), such as between a server and a main storage unit or between the servers through a network, but also among the chips, among the elements in the chip and among the circuit blocks due to a high degree of integration of the semiconductor chip, an increase in the size thereof, and a decrease in the power source voltage (decrease in the signal amplitude). Realizing high-speed signal transmission requires a timing signal generating system (receiving circuit) having a synchronizer, and it has been desired to provide a timing signal generating system featuring a short processing time with a small amount of circuitry.

The prior art and the problems associated with the prior art will be described in detail later with reference to accompanying drawings.

SUMMARY OF THE INVENTION

An object of the present invention is to provide a timing signal generating system (receiving circuit) which features a short processing time with a small amount of circuitry.

According to the present invention, there is provided a timing signal generating system comprising a clock signal generating circuit generating at least one first clock signal upon receipt of at least one reference clock signal by controlling an output phase thereof with a digital code signal; a synchronizing circuit handing over signals between a group of circuits operated by the first clock signal and an internal circuit operated by a second clock signal; a phase code recognizing circuit recognizing a phase code when the phases of the first clock signal and of the second clock signal are in a particular relationship; and a calibration circuit calibrating a relationship between a value of the recognized phase code and a phase difference between the first and second clock signals, wherein the synchronizing circuit is controlled by using phase code data calibrated by the calibration circuit.

Further, according to the present invention, there is also provided a receiver circuit reproducing a clock signal from an input signal and reading data of the input signal by using the reproduced clock signal, comprising a clock signal generating circuit generating at least one first clock signal upon receipt of at least one reference clock signal by controlling an output phase thereof with a digital code signal; a synchronizing circuit handing over signals between a group of circuits operated by the first clock signal and an internal circuit operated by a second clock signal; a phase code recognizing circuit recognizing a phase code when the phases of the first clock signal and of the second clock signal are in a particular relationship; and a calibration circuit calibrating a relationship between a value of the recognized phase code and a phase difference between the first and second clock signals, wherein the synchronizing circuit is controlled by using phase code data calibrated by the calibration circuit.

The group of circuits operated by the first clock signal may comprise a data detecting circuit detecting data from the input signal, and a clock detecting circuit reproducing clocks from the input signal; and the internal circuit operated by the second clock signal may comprise a basic control circuit controlling the clock signal generating circuit. The data detecting circuit may comprise a plurality of data detecting units driven by a group of the first clock signals, and the clock detecting circuit may comprise a plurality of clock detecting units driven by a group of second clock signals having a predetermined phase difference from the group of the first clock signals. The data detecting circuit and the clock detecting circuit may comprise a first group of signal paths and a second group of signal paths, and select signal paths of either the first group or the second group depending upon a point control signal.

A relationship of an integer number of times may exist between a period of the second clock signal and a period of the reference clock signal. The clock signal generating circuit may be a phase interpolator. The phase code data from the calibration circuit, and the phase difference between the first and second clock signals, may be calibrated at the time of closing a power source circuit of an apparatus equipped with the receiving circuit. The synchronizing circuit may comprise a first D-type flip-flop driven by the first clock signal; and a second D-type flip-flop latching recurring signal output from the first D-type flip-flop being driven by the second clock signal. The synchronizing circuit may comprise a selector driven by the first clock signal; and a D-type flip-flop latching recurring signal output from the selector being driven by the second clock signal.

The receiver circuit may further comprise a phase comparator comparing the phase of the first clock signal with the phase of the second clock signal; and a feedback loop processing the output of the phase comparator and feeding it back to the phase code, wherein the phase code may be recognized at the time when the feedback loop is operated to set the phase difference between the first and second clock signals to a predetermined value. The phase comparator may comprise a first D-type flip-flop driven by the first clock signal; and a second D-type flip-flop latching recurring signal output from the first D-type flip-flop being driven by the second clock signal. The phase comparator may comprise a selector driven by the first clock signal; and a D-type flip-flop latching recurring signal output from the selector being driven by the second clock signal.

The calibration circuit may comprise a counter which is reset to zero at a timing when the phase difference between the first and second clock signals assumes a predetermined value and, then, changes in the same manner as the phase code. The calibration circuit may comprise a storage circuit storing, as an offset value, a value of the phase code of when the phase difference between the first and second clock signals may have assumed a predetermined value. The synchronizing circuit may be constituted by a circuit equivalent to a FIFO, and a value of a read pointer of the FIFO may be determined by using a value of a write pointer of the FIFO and by using a value of the phase code.

BRIEF DESCRIPTION OF THE DRAWINGS

The present invention will be more clearly understood from the description of the preferred embodiments as set forth below with reference to the accompanying drawings, wherein:

FIG. 13 is a diagram illustrating the operation of a code generating circuit in a phase detecting circuit of FIG. 12;

FIG. 17 is a block diagram illustrating an interface circuit between a phase interpolator and the synchronizer in the receiving circuit of FIG. 8; and FIG. 18 is a block diagram illustrating the phase interpolator in the receiving circuit of FIG. 8.

DESCRIPTION OF THE PREFERRED EMBODIMENTS

First, prior to describing the embodiments of the present invention in detail, mentioned below with reference to the drawings are problems in the timing signal generating systems and in the receiving circuits of prior arts.

In recent years, it has been urged to increase the speed of transmitting signals per a pin to cope with an increase in the amount of data transmitted among the LSIs, boards or housings. This also is to avoid an increase in the cost of package or the like stemming from an increase in the number of the pins. As a result, the speed of signal transmission among the LSIs exceeds 1 Gbps and is expected to become as high as 4 Gbps or 10 Gbps (high-speed signal transmission) in the future (within 3 to 8 years from now).

As the signal frequencies become so high, a delay in the buffer and in the wiring for transmitting the data and clock signals accounts for a ratio (which, depending upon the cases, could become many times as large as the period of the clock signals) which is no longer negligible with respect to the period of the clock signals. Here, it can be considered that the phase of the clock signals that are transmitted is quite irrelevant to the phase of the clock signals used for operating the internal circuit of the chip. In order to transfer the signals from the clock signal region used for receiving high-speed signals into the clock signal region used by the internal circuit, it is necessary to employ a synchronizer which executes the so-called change of clock signals.

Figure 1:
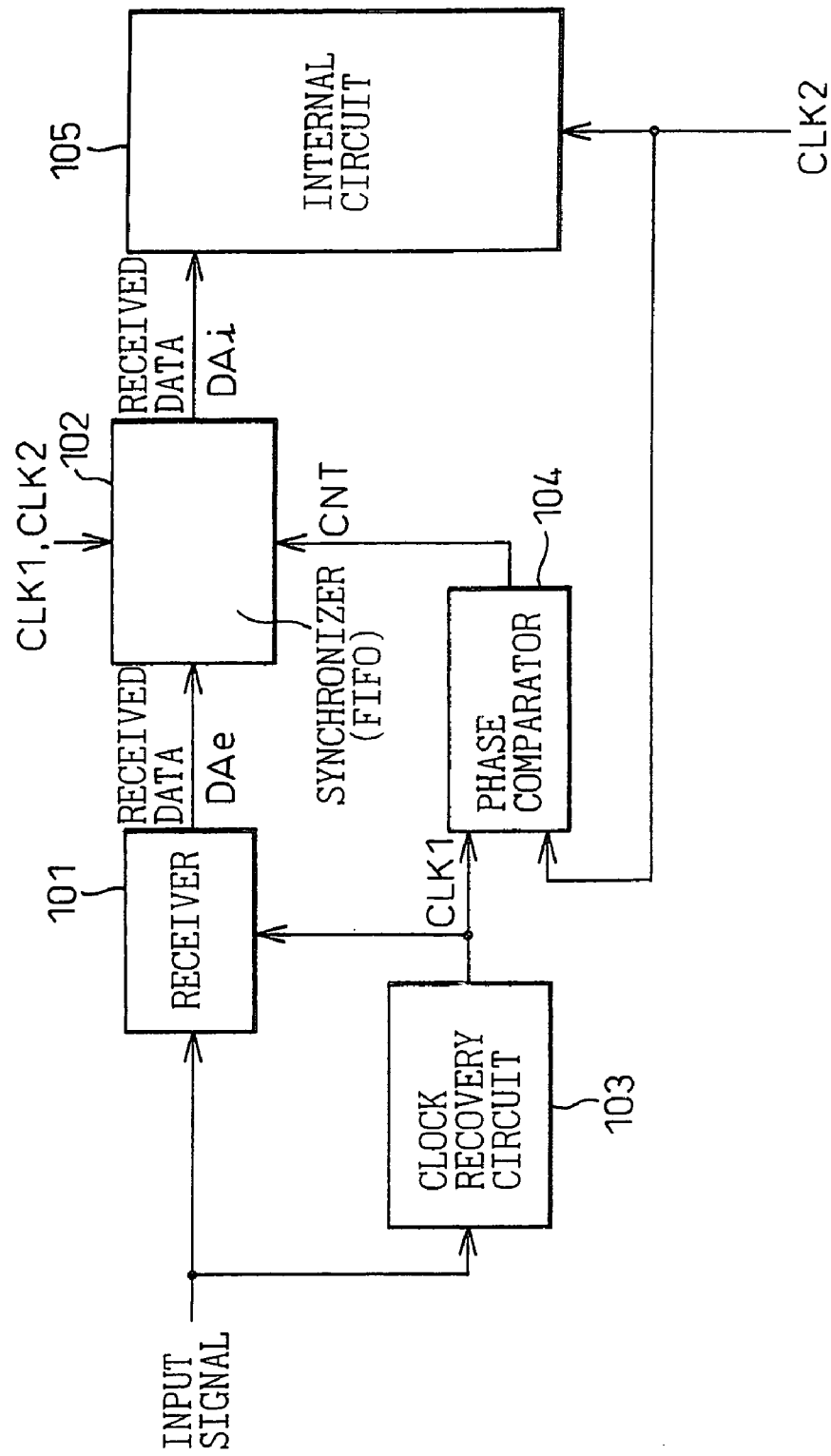
FIG. 1 is a block diagram illustrating a conventional timing signal generating system (receiving circuit)

Referring to FIG. 1, an input signal (e.g., a high-speed signal supplied through a transmission line) is supplied to a receiver 101 as well as to a clock signal recovery circuit 103. The clock signal recovery circuit 103 forms a clock signal CLK1 from the input signal and supplies it to the receiver 101 (synchronizer 102) and to a phase comparator 104. The receiver 101 reproduces a data (received data DAe) according to the clock signal (external clock signal) CLK1 from the clock signal recovery circuit 103, and supplies the received data DAe which is in synchronism with the external clock signal CLK1 to the synchronizer 102.

The phase comparator 104 receives the external clock signal CLK1 and a clock signal (internal clock signal) CLK2 supplied to the internal circuit 105 (synchronizer 102) to compare their phases, and supplies a control signal CNT to the synchronizer 102. The synchronizer 102 is constituted, for example, as a FIFO (first-in first-out) buffer, and converts the received data DAe in synchronism with the external clock signal CLK1 into a received data DAi in synchronism with the internal clock signal CLK2, and supplies it to the internal circuit 105.

As described above, the synchronizer 102 converts the received data DAe in synchronism with the external clock signal CLK1 used for receiving a high-speed signal into the received data DAi in synchronism with the internal clock signal CLK2 used in the internal circuit 105. Concretely speaking, the synchronizer 102 writes the received data DAe into a memory or a register (e.g., D-type flip-flop: D-FF) by using the external clock signal CLK1, and reads out the internal clock signal CLK2 from the memory and the register thereby to obtain the received data DAi.

At this time, if the writing and reading timings are not suitably selected, e.g., if the phase of the external clock signal CLK1 comes into agreement with the phase of the internal clock signal CLK2, there arise problems in that the data are not correctly read out, or the data are read out when the output of the D-FF is in an intermediate state (metastable state) between "0" and "1".

In order to avoid such problems, it is necessary to monitor the phase difference between the external clock signal CLK1 and the internal clock signal CLK2 at all times. Besides, the circuit (phase comparator 104) for detecting the phase difference between the two clock signals must have a delay which is large enough to avoid the metastable state. Accordingly, the conventional timing signal generating system equipped with a synchronizer, for changing the clock signals, is accompanied by problems such as an increase in the amount of circuitry, and an increase in the processing time, which must be solved.

Next, described below are the principle and constitution of a timing signal generating system (receiving circuit) according to the present invention.

Figure 2:
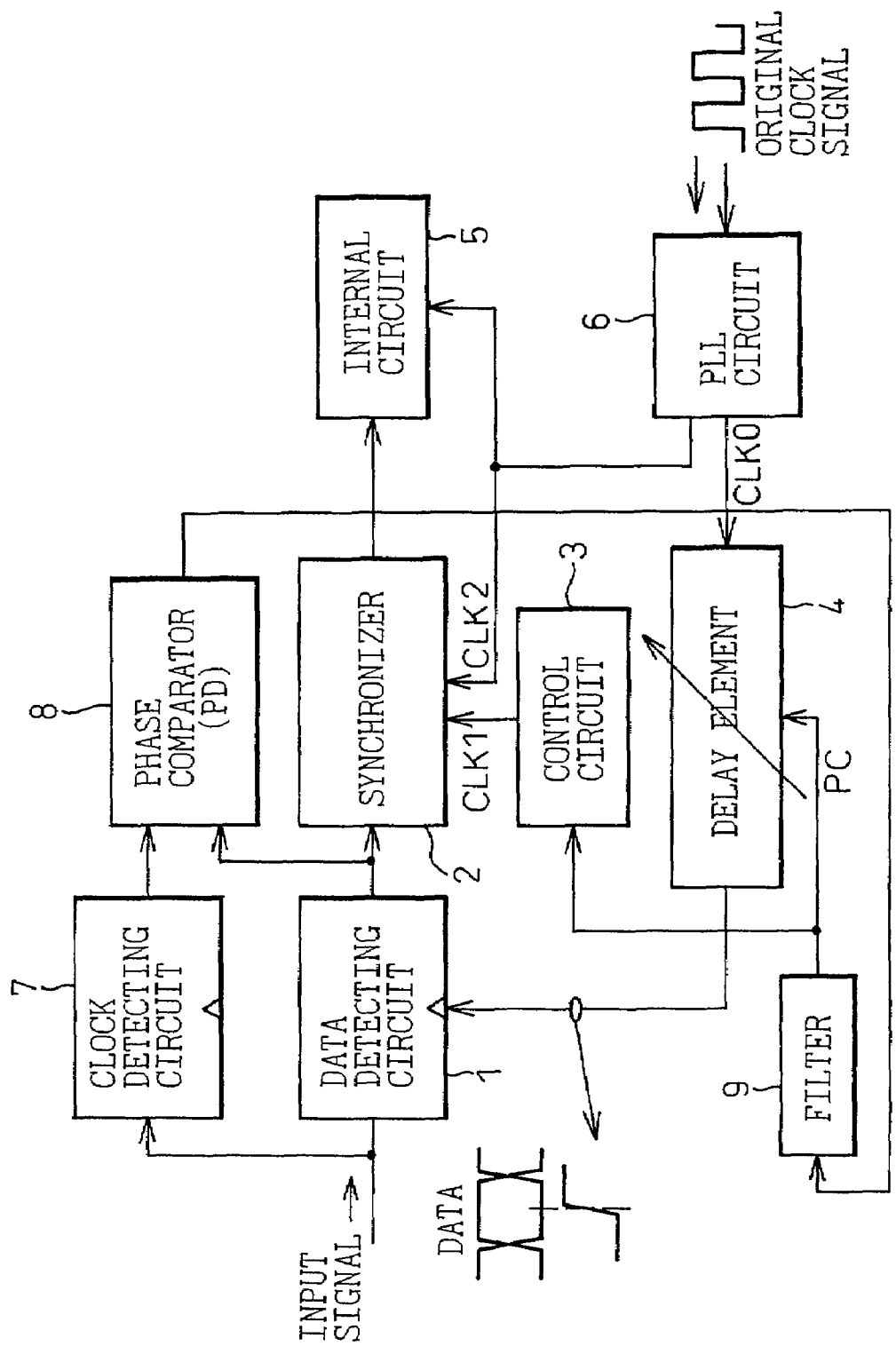
FIG. 2 is a block diagram illustrating the principle and constitution of a timing signal generating system (receiving circuit) according to the present invention.

FIG. 2 is a block diagram illustrating the principle and constitution of the timing signal generating system (receiving circuit) according to the present invention. In FIG. 2, reference numeral 1 denotes a data detecting circuit (RX), 2 denotes a synchronizer, 3 denotes a control circuit, 4 denotes a delay element (e.g., phase interpolator: PI), 5 denotes an internal circuit (user logic), 6 denotes a PLL (phase locked loop) circuit, 7 denotes a clock detecting circuit, 8 denotes a phase comparator (phase detector: PD), and 9 denotes a filter (digital filter).

Referring to FIG. 2, the timing signal generating system (receiving circuit) according to the present invention uses a delay element 4 capable of adjusting the phase with a digital phase code, such as a phase interpolator for receiving signals of a high speed. Reference clock signals CLK0 of the phase interpolator (delay element) and clock signals (second clocks) CLK2 for driving the internal circuit 5, are formed from the same original clock signals by dividing the frequency by using the PLL circuit 6 and the like circuit, and a relationship of an integer times exists between their frequencies.

The phase interpolator 4 is usually adjusted by a feedback loop so as to sample the center of data (data eye) of input signals of a high speed. Upon observing the phase code PC in this state, it is allowed to recognize a change in the phase of the clock signals that are used for receiving the high-speed signals.

However, a relationship of phase is still not obvious between the value of the phase code PC and the clock signal CLK2 driving the internal circuit 5. Therefore, it is not possible to control the synchronizer 2 by directly using the value of the phase code PC.

According to the present invention, therefore, means (calibration means) is provided for calibrating the relationship between the value of the phase code PC and the clock signal CLK2 that drives the internal circuit. This corresponds to recording the value of the phase code PC in a state where the output clock signal of the phase interpolator 4 (clock signal supplied to the data detecting circuit 1) and the clock signal CLK2 for driving the internal circuit, are in a particular phase relationship (e.g., a relationship in which the rising edges are in agreement). If the relationship is once clarified between the phase code value and the phase difference, it becomes possible to control the write timing (first clock signal CLK1) and read timing (second clock signal CLK2) in the synchronizer 2 by using the phase code value.

The operation of calibration can be executed by temporarily constituting a phase comparator loop including the phase interpolator and the phase comparator for calibration (circuit for comparing the phase of the clock signal output from the phase interpolator with the phase of the clock signal for driving the internal circuit) and by observing the phase code in a state where the phases are locked.

According to the timing signal generating system (receiving circuit) of the present invention as described above, it is allowed to control the read timing of the synchronizer by directly using the phase code obtained from the high-speed signal receiver, and to execute the control by shortening the delay time as compared to the circuit that compares the phases at all times. According to the present invention, further, if the calibration is once effected, the phase comparator need not be operated thereafter. Besides, there does not occur the problem of metastable state due to the comparison of phases. Moreover, observing the phase code of the phase interpolator makes it possible to learn the phase while maintaining a resolution higher than that of the phase comparator and to constitute a synchronizer of a low latency.

Embodiments of the timing signal generating system (receiving circuit) according to the present invention will now be described in detail with reference to the accompanying drawings.

Figure 3:
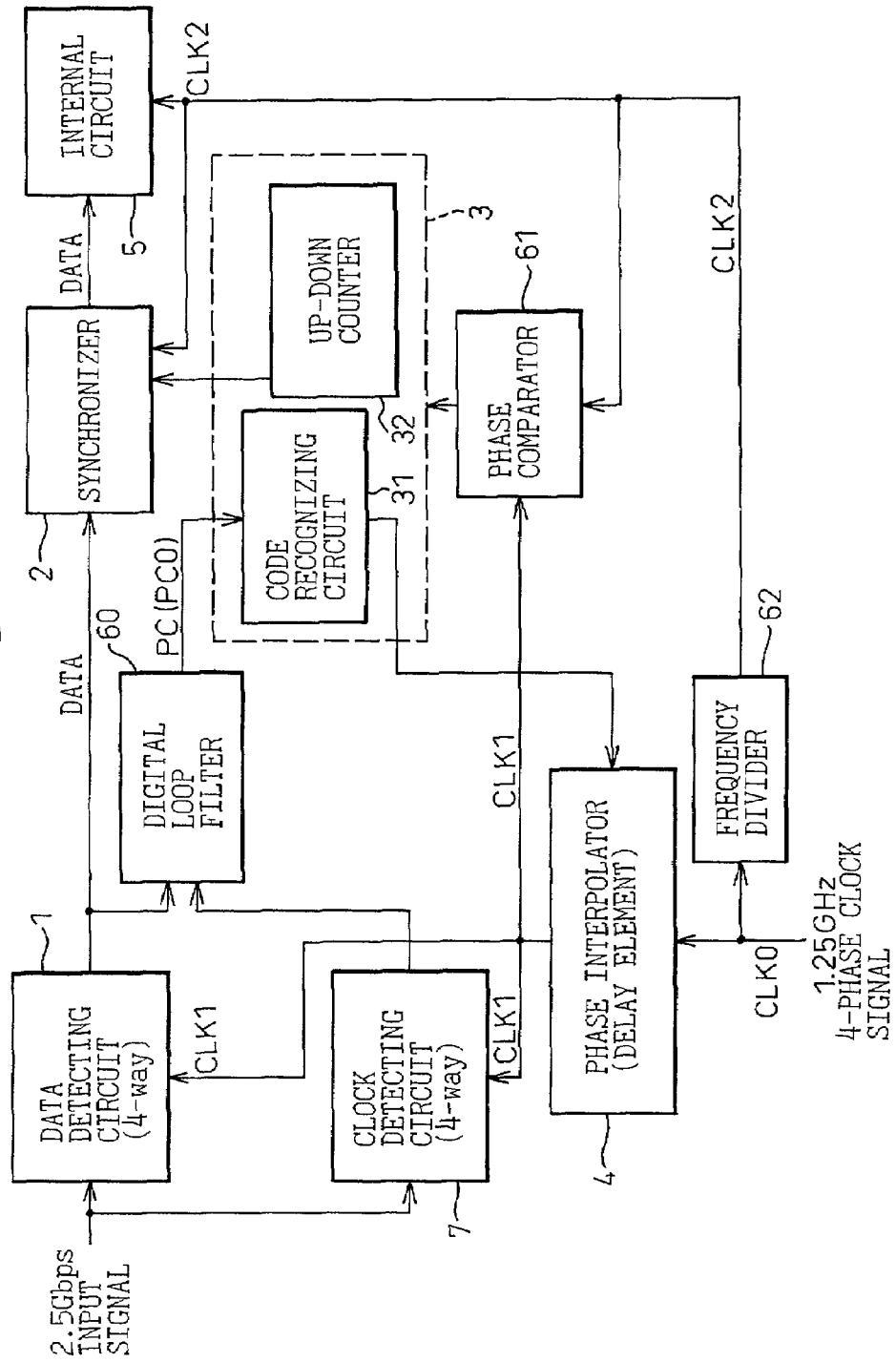
FIG. 3 is a block diagram illustrating the timing signal generating system according to a first embodiment of the present invention.

FIG. 3 is a block diagram illustrating the timing signal generating system according to a first embodiment of the present invention. In FIG. 3, reference numeral 1 denotes a data detecting circuit, 2 denotes a synchronizer, 3 denotes a control circuit, 4 denotes a phase interpolator (delay element), 5 denotes an internal circuit (user logic), and 7 denotes a clock detecting circuit. Further, reference numeral 31 denotes a code recognizing circuit, 32 denotes an up-down counter, 60 denotes a digital loop filter, 61 denotes a phase comparator (phase detector; PD), and 62 denotes a frequency divider. In the following embodiments, the same constituent elements are denoted by the same reference numerals.

In the timing signal generating system of the first embodiment as shown in FIG. 3, the input signals are high-speed signals of 2.5 Gbps. The high-speed input signals are fed to the data detecting circuit 1 constituted by D-type flip-flops (D-FFs) and to the clock detecting circuit 7, which undergo 4-way operations with 4-phase clock signals of 625 MHz. Here, the data detecting circuit 1 detects (decides) the data from the input signals by sampling the data of bit cells using 4-phase clock signals (four clock signals having phases different by 90 degrees from one another) of 625 MHz, and the clock detecting circuit 7 reproduces the clock signals from the input signals by detecting the boundaries of the bit cells similarly using the 4-phase clock signals of 625 MHz. The 4-phase clock signals fed to the data detecting circuit 1 and the 4-phase clock signals fed to the clock detecting circuit 7, have phase differences of 45 degrees, and are used for detecting the data and boundaries of the bit cells.

The 4-phase clock signals of 625 MHz fed to the data detecting circuit 1, and to the clock detecting circuit 7, are formed by the phase interpolator 4 supplied with, for example, 4-phase clock signals of 1.25 GHz (CLK0: two sets of complementary signals of 1.25 GHz having phases different by 90 degrees). The 4-phase clock signals CLK0 fed to the phase interpolator 4 are divided into clock signals CLK2 of, for example, 312.5 MHz by a frequency divider 62, and are supplied to the internal circuit 5. The clock signals CLK2 are further supplied to the synchronizer 2 and to the phase comparator 61.

The digital loop filter 60 receives the outputs from the data detecting circuit 1 and from the clock detecting circuit 7, and produces a phase code PC corresponding to a phase difference therebetween. The phase code PC is fed back to the phase interpolator 4 through the code recognizing circuit 31 in the control circuit 3.

Here, the data produced from the data detecting circuit 1 are in synchronism with the first clock signals CLK1, and the data produced from the synchronizer 2 are in synchronism with the second clock signals CLK2 which are the same as those for driving the internal circuit 5.

The timing signal generating system of the first embodiment observes the output of the phase comparator 61 which compares the phase of the clock signal CLK2 for driving the internal circuit 5 with the phase of the output (clock signal CLK1) of the phase interpolator 4, searches (recognizes) the phase code PC that is fed back to the phase interpolator 4 by using the code recognizing circuit 31, and finds a phase code (PC0) with which the phase difference between the two clock signals CLK1 and CLK2 becomes zero. The up-down counter 32 in the control circuit 3 is reset to zero in a state where the phase code value PC0 is given.

Thereafter, the up-down counter 32 executes quite the same operation as for increasing or decreasing the control code PC of the phase interpolator 4. Here, in the locked state, the rising edges of the two clock signals CLK1 and CLK2 are in agreement. Therefore, the value of the up-down counter 32 directly represents a phase difference between the two clock signals CLK1 and CLK2.

The timing signal generating system according to the first embodiment controls, for example, the read address of the RAM used for the synchronizer 2 by using the value of the up-down counter 32, in order to control the synchronizer 2 maintaining a phase of a high precision without the need of comparing the phases every time.

Figure 4:
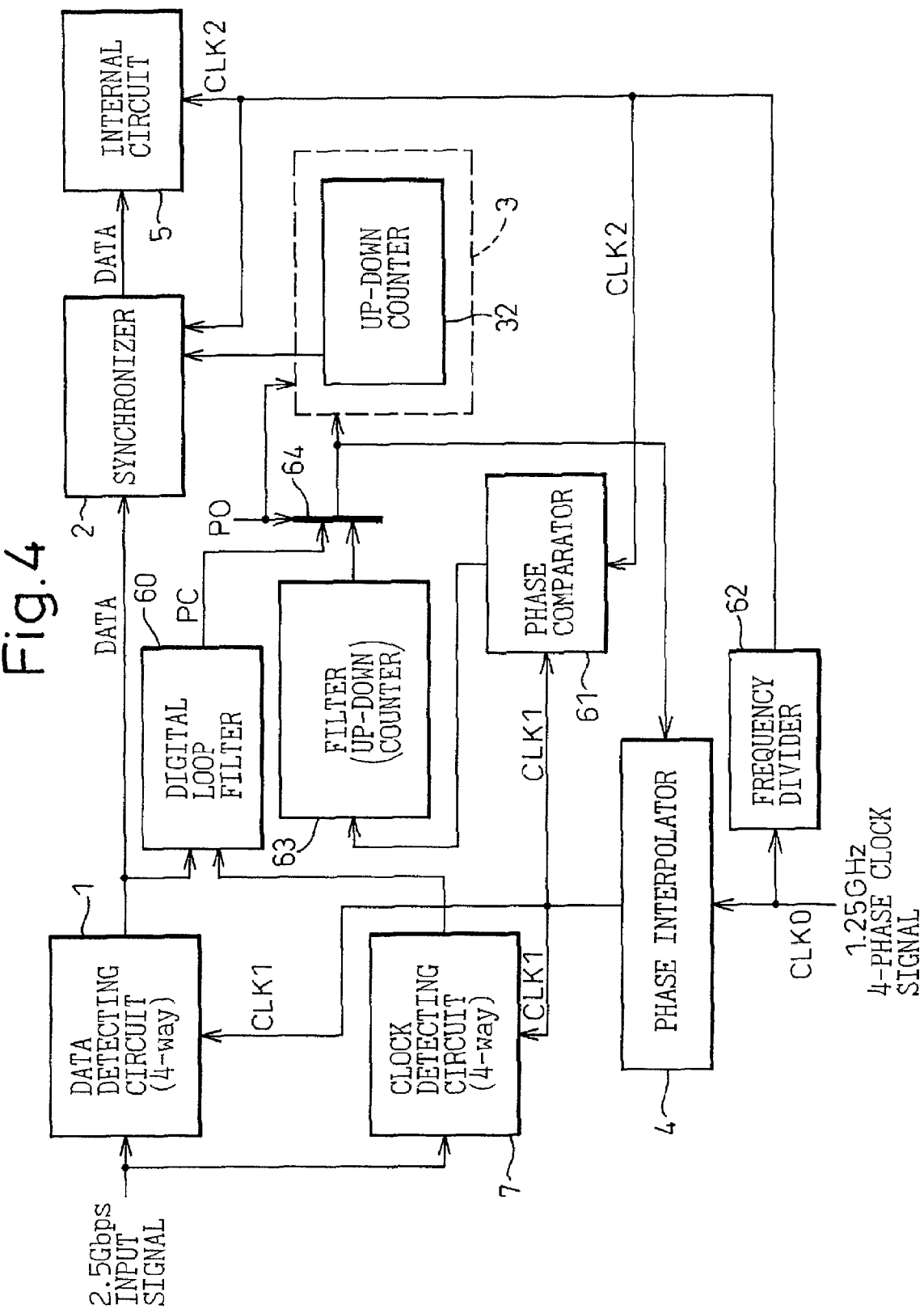
FIG. 4 is a block diagram illustrating the timing signal generating system according to a second embodiment of the present invention.

FIG. 4 is a block diagram illustrating the timing signal generating system according to a second embodiment of the present invention. In FIG. 4, reference numeral 63 denotes a filter (up-down counter), and 64 denotes a selector controlled by a signal PO.

Referring to FIG. 4, the timing signal generating system according to the second embodiment temporarily forms a phase locked loop at the time the power is turned on (at the start up) so that a difference of phase between the two clock signals CLK1 and CLK2 becomes zero. Namely, at the time the power is turned on, the selector 64, in response to the signal P0 of a high level "H", selects the output of the filter (up-down counter) 63 to which is supplied the output of the phase comparator 61, and the output of the filter 63 is fed back to the phase interpolator 4. Here, the phase comparator 61 is supplied with two clock signals CLK1 and CLK2 to thereby form a loop which renders the phase difference between the clock signals CLK1 and CLK2 to be zero. In a state where the loop is locked, the value of the up-down counter 32 in the control circuit 3 is reset to zero.

Next, when the power is turned off, the selector, in response to the signal PO of a low level "L", selects the output of the digital loop filter 60. The up-down counter 32 that is reset when the power is turned on, then, undergoes a change in the same manner as the phase code (PC) of the phase interpolator 4.

In the timing signal generating system of the second embodiment as described above, a phase code (PC0) at which the phase difference becomes zero is automatically searched by the feedback loop, and the calibration is accomplished with a minimum of additional circuitry.

Figure 5:
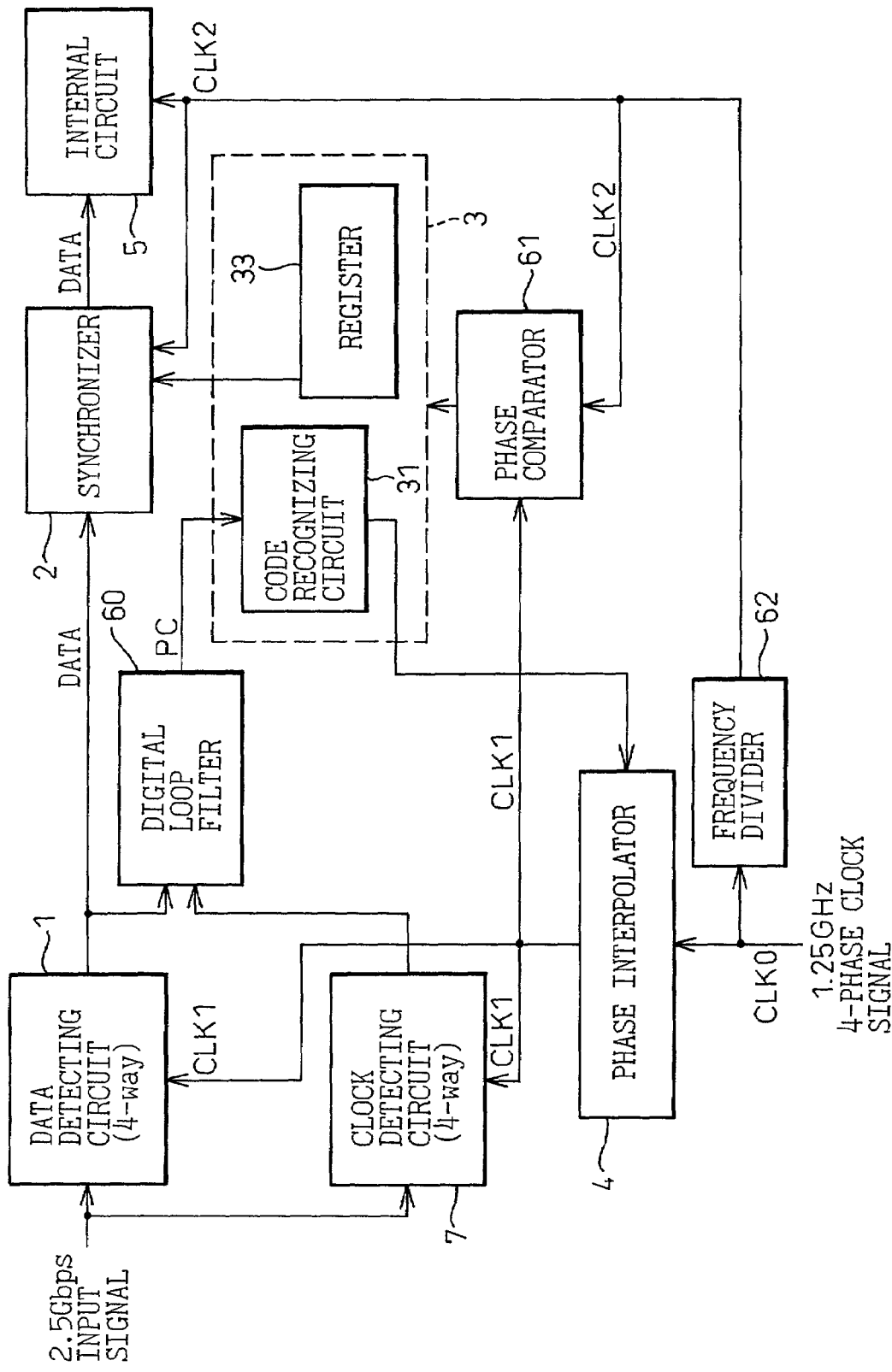
FIG. 5 is a block diagram illustrating the timing signal generating system according to a third embodiment of the present invention.

FIG. 5 is a block diagram illustrating the timing signal generating system according to a third embodiment of the present invention. In FIG. 5, reference numeral 33 denotes a register.

As will be obvious from the comparison of FIG. 2 with FIG. 5, the timing signal generating system of the third embodiment is provided with the register 33 instead of the up-down counter 32 in the control circuit 3 of the first embodiment of FIG. 2.

Namely, in the timing signal generating system of the third embodiment, a value (PC0) of the phase code is stored in the register 33 at a moment when the code recognizing circuit 31 has recognized the phases of the two clock signals CLK1 and CLK2 that are brought into agreement without providing the up-down counter 32 in the control circuit 3. Thereafter, the control circuit 3 calculates a difference between the phase code PC and the value (PC0) stored in the register 33 to learn a relationship of phase between the two clock signals CLK1 and CLK2, and to control the synchronizer 2.

Figure 6:
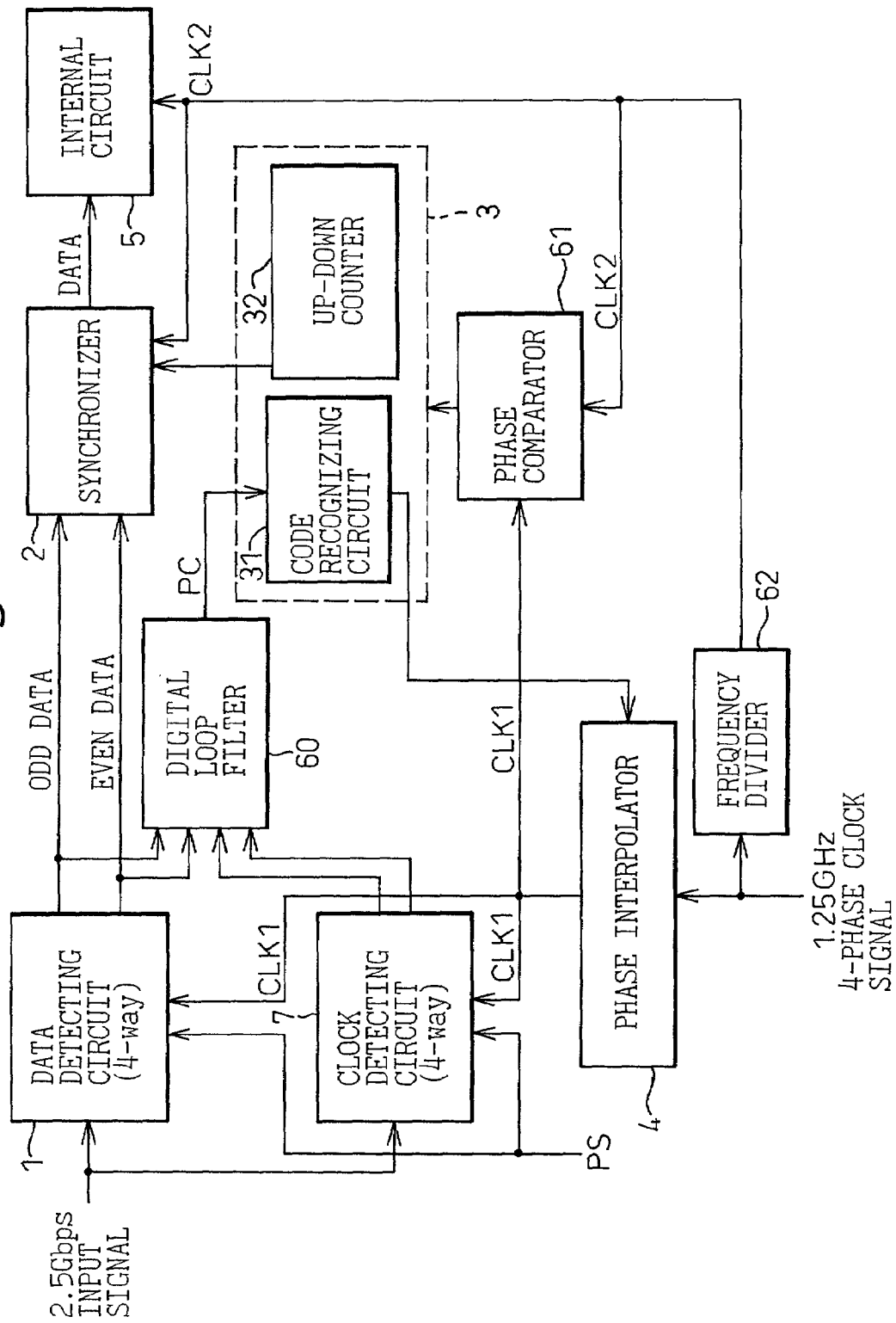
FIG. 6 is a block diagram illustrating the timing signal generating system according to a fourth embodiment of the present invention.

FIG. 6 is a block diagram illustrating the timing signal generating system according to a fourth embodiment of the present invention.

According to the timing signal generating system according to the fourth embodiment as shown in FIG. 6, the data detecting circuit 1 and the clock detecting circuit 7 in the timing signal generating system of the first embodiment of FIG. 3 are constituted in an even-number structure and in an odd-number structure using pointer signals PS in order to halve the frequency of the clock (first clocks) CLK1 (into, for example, 312.5 MHz).

That is, in the timing signal generating system of the fourth embodiment, the data detecting circuit 1 and the clock detecting circuit 7 that operate in 4-way fashion, write a signal into signal paths of a first group of signal paths (even signal paths) or a second group of signal paths (odd signal paths) in response to an output of a 1-bit D-FF which works as a pointer being controlled by a pointer signal PS. Therefore, the clock signals (CLK1) that effect the writing have a frequency of 312.5 MHz, and the output D-FF samples the output of the written D-FF relying upon the internal clock signals (CLK2) of 312.5 MHz. The output is sampled at a correct timing by using a phase code for rearranging the signals of a first group (even number) and of a second group (odd number).

Figure 7:
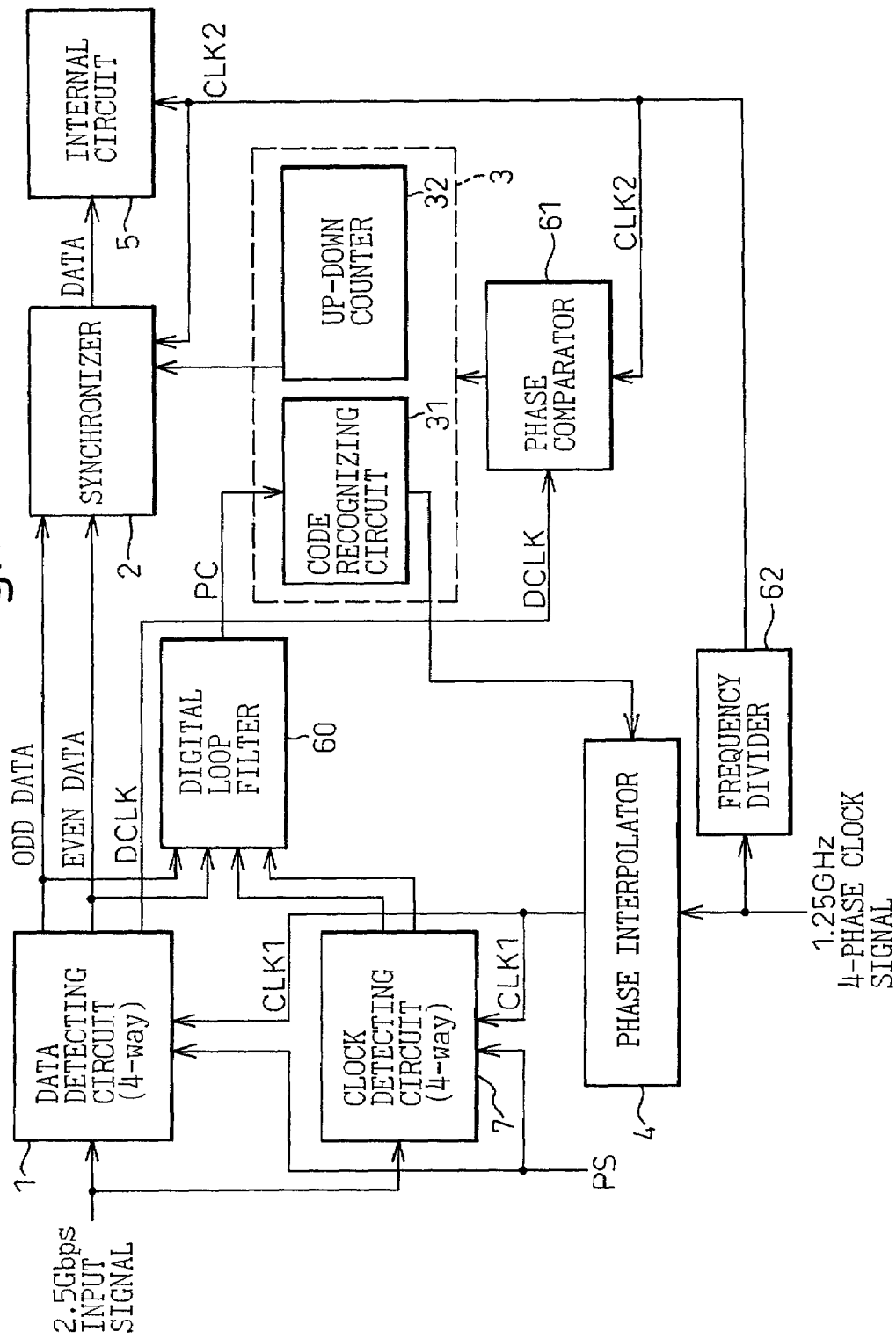
FIG. 7 is a block diagram illustrating the timing signal generating system according to a fifth embodiment of the present invention.

FIG. 7 is a block diagram illustrating the timing signal generating system according to a fifth embodiment of the present invention.

As will be obvious from the comparison of FIG. 6 with FIG. 7, the timing signal generating system according to the fifth embodiment supplies a data clock signal DCLK to the phase comparator 61 of the fourth embodiment of FIG. 6 instead of supplying the first clock signal (clock signal for driving the data detecting circuit and the like circuit) CLK1, and compares the phase of the data clock signal DCLK with the second clock signal (for driving the internal circuit) CLK2. Here, the data clock signal DCLK is the one for compensating the delay of the registers.

That is, in the timing signal generating system of the fifth embodiment, the phase comparator 61 does not directly compare the high-speed received clock signal (first clock signal) CLK1 with the clock signal (second clock signal) CLK2 for driving the internal circuit, but compares a periodic pattern signal (data clock signal DCLK) "0101- - -" obtained by driving the same circuit as the data detecting circuit (decision circuit) 7 using the clock signal CLK1 for receiving high-speed signals, with the clock signal CLK2 for driving the internal circuit. Here, comparison by the phase comparator 61 is effected by using the same D-FF as the one used by the output D-FF in the synchronizer 2 for sampling the data. That is, the phase comparator 61 uses the D-FF of the same circuit constitution as the output D-FF, samples the data clock signals DCLK similarly using the clock signal CLK2 for driving the internal circuit, and uses the output as the result of phase comparison.

According to the fifth embodiment, the delay in the detecting (decision) circuit used in the synchronizer 2 and the set-up/holding time of the output D-FF are compensated, making it possible to realize a circuit that properly operates over a wide range of processes, temperatures and voltages.

Figure 8:
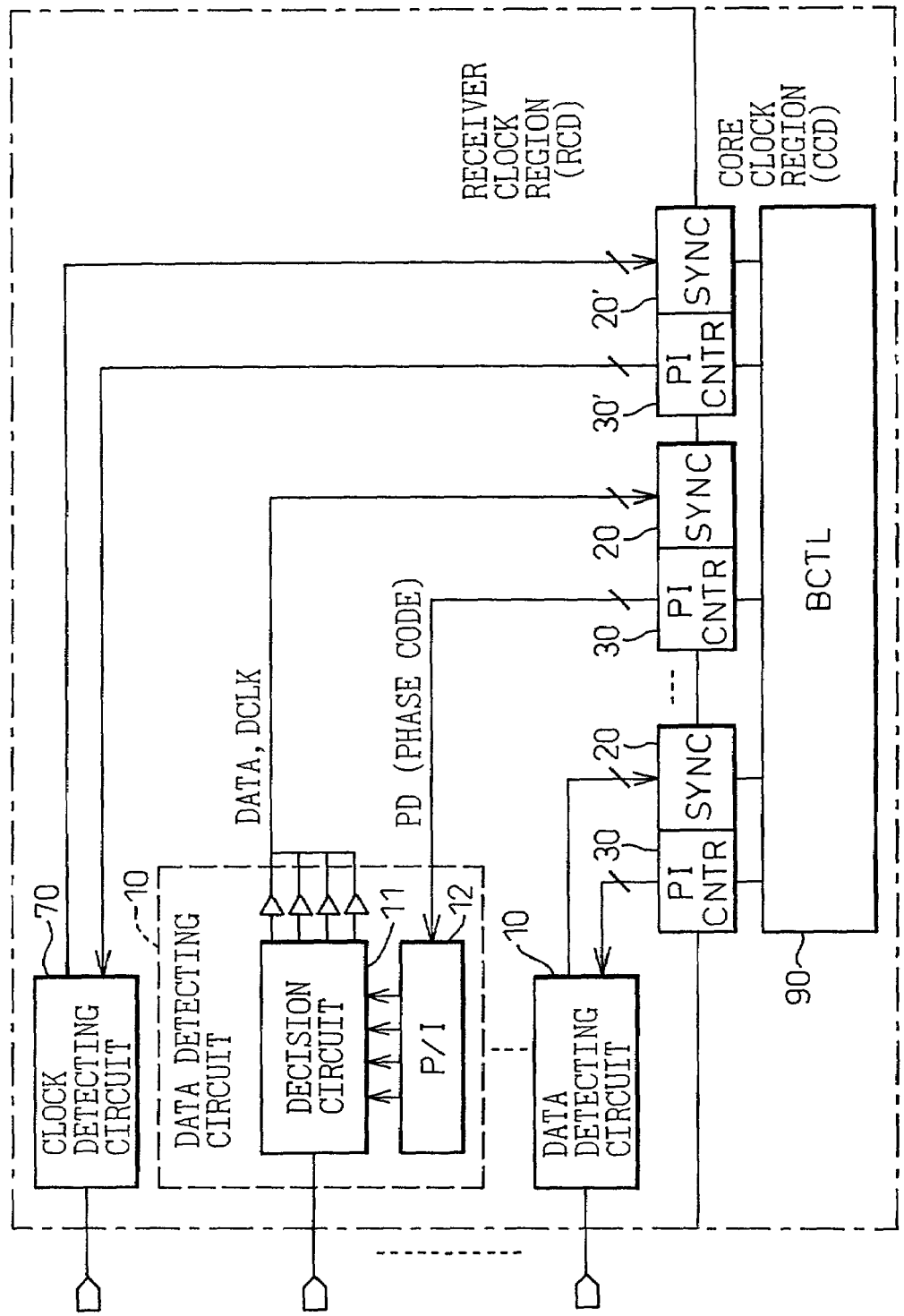
FIG. 8 is a block diagram illustrating an architecture of a receiving circuit to which the present invention is applied.

FIG. 8 is a block diagram illustrating an architecture of the receiving circuit to which the present invention is applied, the architecture being that of the parallel receiver. In FIG. 8, reference numeral 10 denotes data detecting circuits (data detecting units), 11 denotes a decision circuit (detecting circuit), 12 denotes a phase interpolator (P/I), 20 and 20' denote synchronizers (SYNC), 30 and 30' denote phase interpolator counters (PI CONTR), 70 denotes a clock detecting circuit (clock detecting unit), and 90 denotes a basic control circuit (BCTL unit).

The receiving circuit includes a receiver clock region RCD having the clock detecting circuit 70 driven by the first clock (receiver clock: CLK1) and a plurality of data detecting circuits 10, and a core clock region CCD (internal circuit 5) having the BCTL unit 90.

The data detecting circuits 10 and the clock detecting circuit 70 perform 4-way operations, and include the decision circuit 11 (corresponding, for example, to the data detecting circuit 1 in FIG. 7) and the phase interpolator 12 (corresponding, for example, to the phase interpolator 4 in FIG. 7), respectively. Each phase interpolator 12 is supplied with the outputs from the phase interpolator counters (PI counters) 30 and 30'. The output of each decision circuit 11 is supplied to the synchronizers 20 and 20', and is sent to the core logic (internal circuit). The code (phase control code) of the phase interpolator is formed by the BCTL unit 90 in the core logic.

Figure 9:
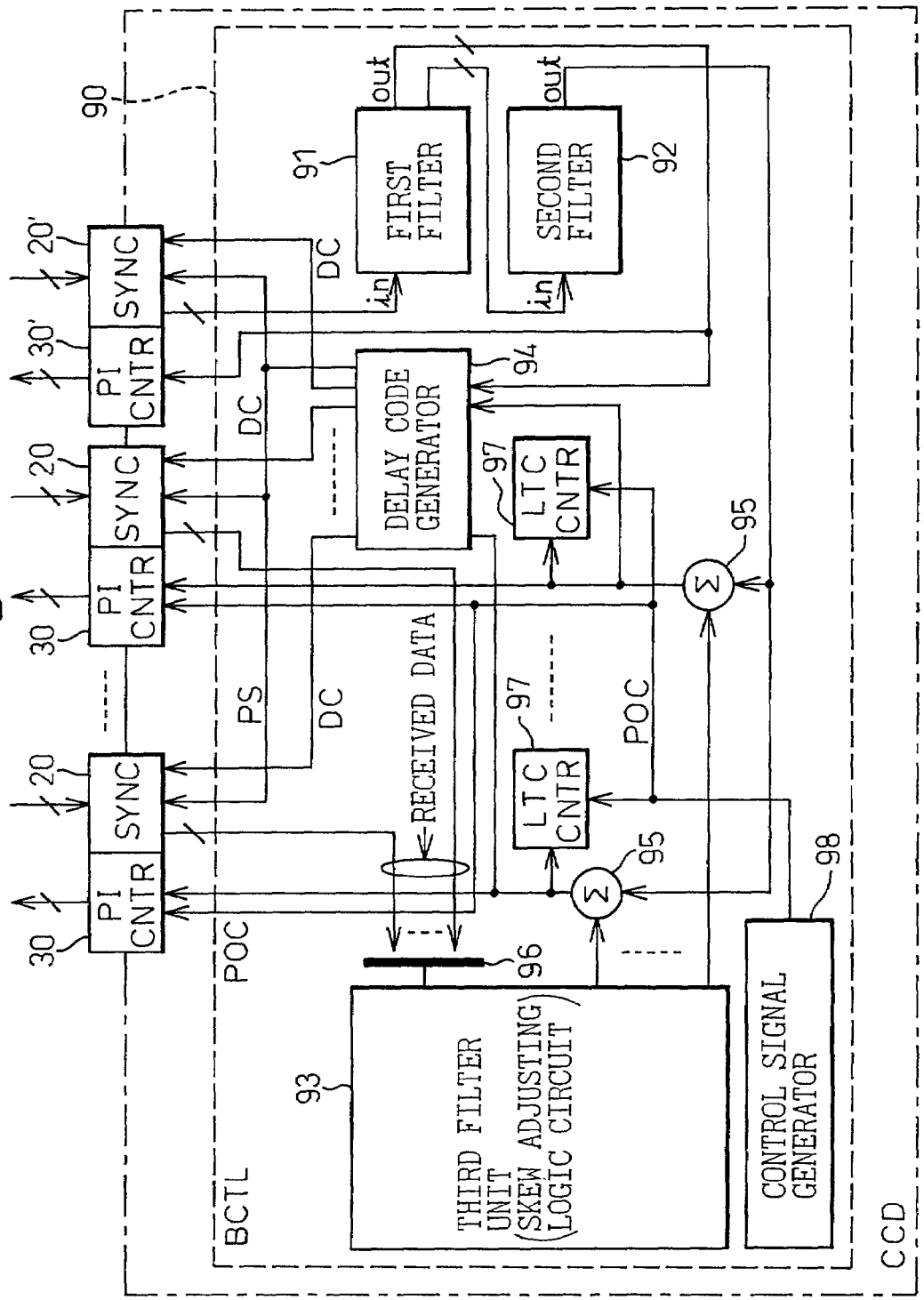
FIG. 9 is a block diagram illustrating a BCLT unit in the receiving circuit of FIG. 8.

FIG. 9 is a block diagram illustrating the BCTL unit 90 in the receiving circuit of FIG. 8.

The BCTL unit 90 is provided in the core logic region CCD, and controls the synchronizers 20, 20' and the PI counters 30, 30'. That is, as shown in FIG. 9, the BCTL unit 90 includes a first filter 91, a second filter 92, a third filter 93, a delay code generating circuit 94, an adder 95, a selector 96, a latency counter (LTC CNTR) 97 and a control signal generator 98. The BCTL unit 90 forms a pointer control signal PS for controlling the read pointer used by the synchronizers 20, 20', a delay code DC, control codes (b0, b1, b2) given to the PI counters 30, 30', and a phase offset cancel signal POC.

With the exception of the output signal of which the sign is reversed, the latency counter 97 is constituted similarly to the PI counter 30, calibrates the phase code, and indicates the delay amount of the data from the value counted by the latency counter 97. The operation for resetting the latency counter 97 by calibrating the phase code is effected by using the phase offset cancel signal POC from the control signal generator 98. The control signal generator 98 generates not only the phase offset cancel signal POC but also various control signals needed by the receiving circuit.

As will be described later with reference to FIG. 17, the phase offset cancel signal POC controls a selector 302 to calibrate the phase code for a counter 301. As will be described later (or, as shown in FIG. 7), further, the pointer control signal PS is used for the synchronizers 20, 20' (2) to select a suitable data path, i.e., to select an even path for transmitting a signal of an even number or for selecting an odd path for transmitting a signal of an odd number.

Referring to FIGS. 8 and 9, the digital filters (first filter 91 and second filter 92) decide the delay/advance of the internal clock relative to the input clock relying upon the output from the clock detecting circuit 70 through the synchronizer 20', and feed the output back to the phase interpolator 12 in the clock detecting circuit 70 through the PI counter 30'. Here, the PI counter 30' is supplied with the output of the first filter 91, and the PI counters 30 are supplied with the sum of the output of the second filter 92 and the output of the third filter unit 93, which are added up through an adder 95. The feedback (up or down) value is fed even to the phase interpolators 12 in the data detecting circuits 10 through the PI counters 30.

Here, the synchronizers 20, 20' are controlled by the delay code DC which expresses the delay amount in a digital value. The third filter unit 93 includes a logic circuit for adjusting the skew between the clock detecting circuit 70 and the data detecting circuit 0. Due to the logic circuit for skew adjustment, phase errors in the receivers (clock detecting circuit 70 and data detecting circuit 10) are minimized.

Figure 10:
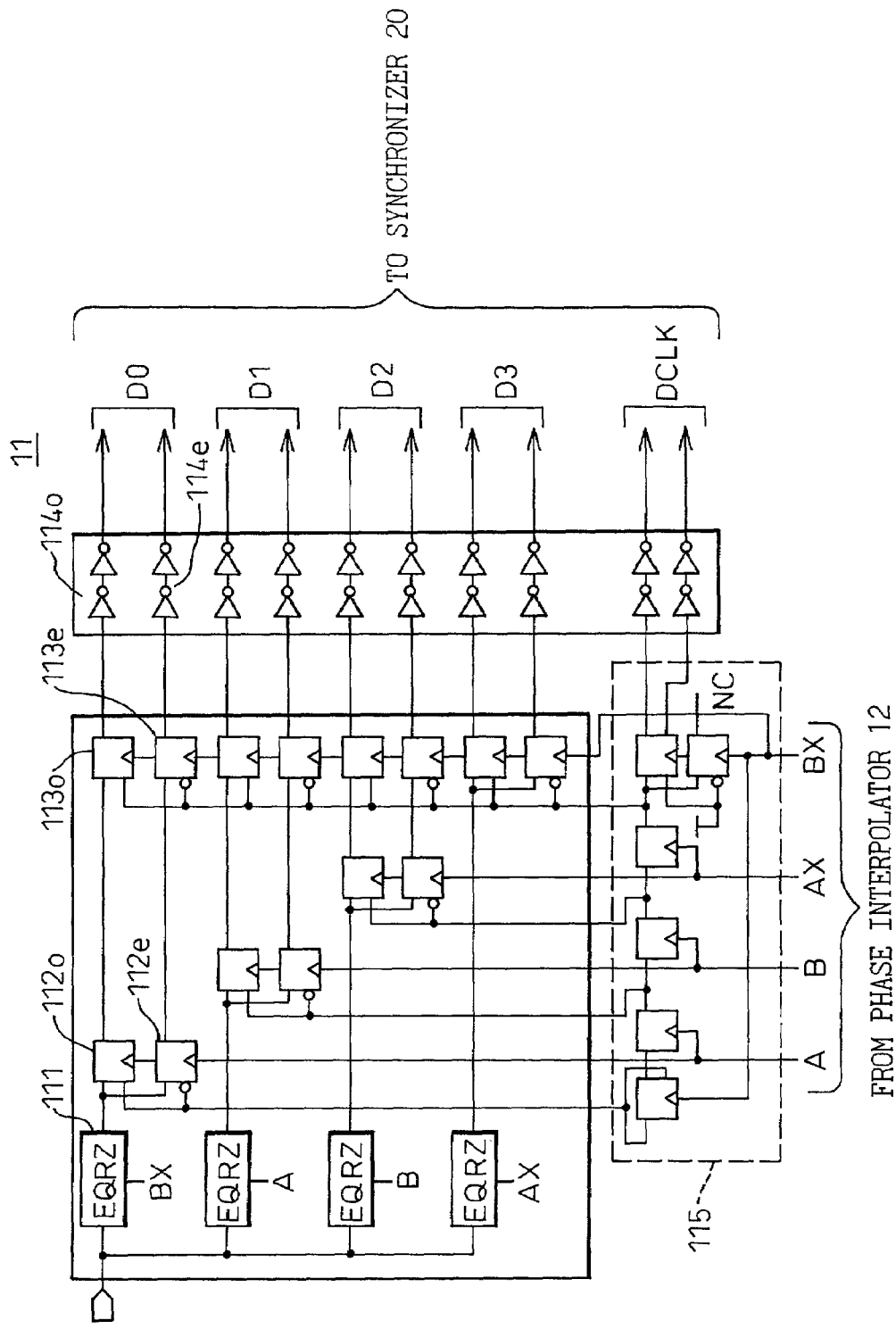
FIG. 10 is a block diagram illustrating a receiver decision circuit in the receiving circuit of FIG. 8.

FIG. 10 is a block diagram illustrating a receiver decision circuit 11 in the receiver circuit of FIG. 8. In FIG. 10, reference numeral 111 denotes equalizers, reference numerals 112o, 113o and 112e, 113e denote data decision units (D-type flip-flops: D-FFS) for odd paths and even paths, 114o and 114e denote buffers for odd paths and even paths, and reference numeral 115 denotes a control signal generator.

The decision circuit 11 plays the role of handing the data over to the synchronizer in a subsequent stage. The input signal is supplied, via equalizers (EQRZ) 111, to the data decision units 112o, 113o for odd paths and to the data decision units 112e, 113e for even paths. Here, the data decision units 112o, 113o for odd paths and the data decision units 112e, 113e for even paths, are alternately driven by the output of the control signal generator 115 which is supplied with 4-phase clock signals (two sets of complementary signals having phases different by 90 degrees) A, B, AX, BX. The equalizers (four equalizers) are successively driven by 4-phase clock signals A, B, AX, BX having phases different by 90 degrees from one another. The outputs of the data decision units 112o, 113o for odd paths and the outputs of the data decision units 112e, 113e for even paths, are produced as data D0 (D0 to D3) through the buffers 1140o to 114e.

Here, the 4-phase clock signals A, B, AX and BX are input to the decision circuit 11 as outputs of the phase interpolators 12, and the data D0 to D3 as well as the data clock signal DCLK are sent to the synchronizers (latter half portions of the synchronizers) 20.

Figure 11:
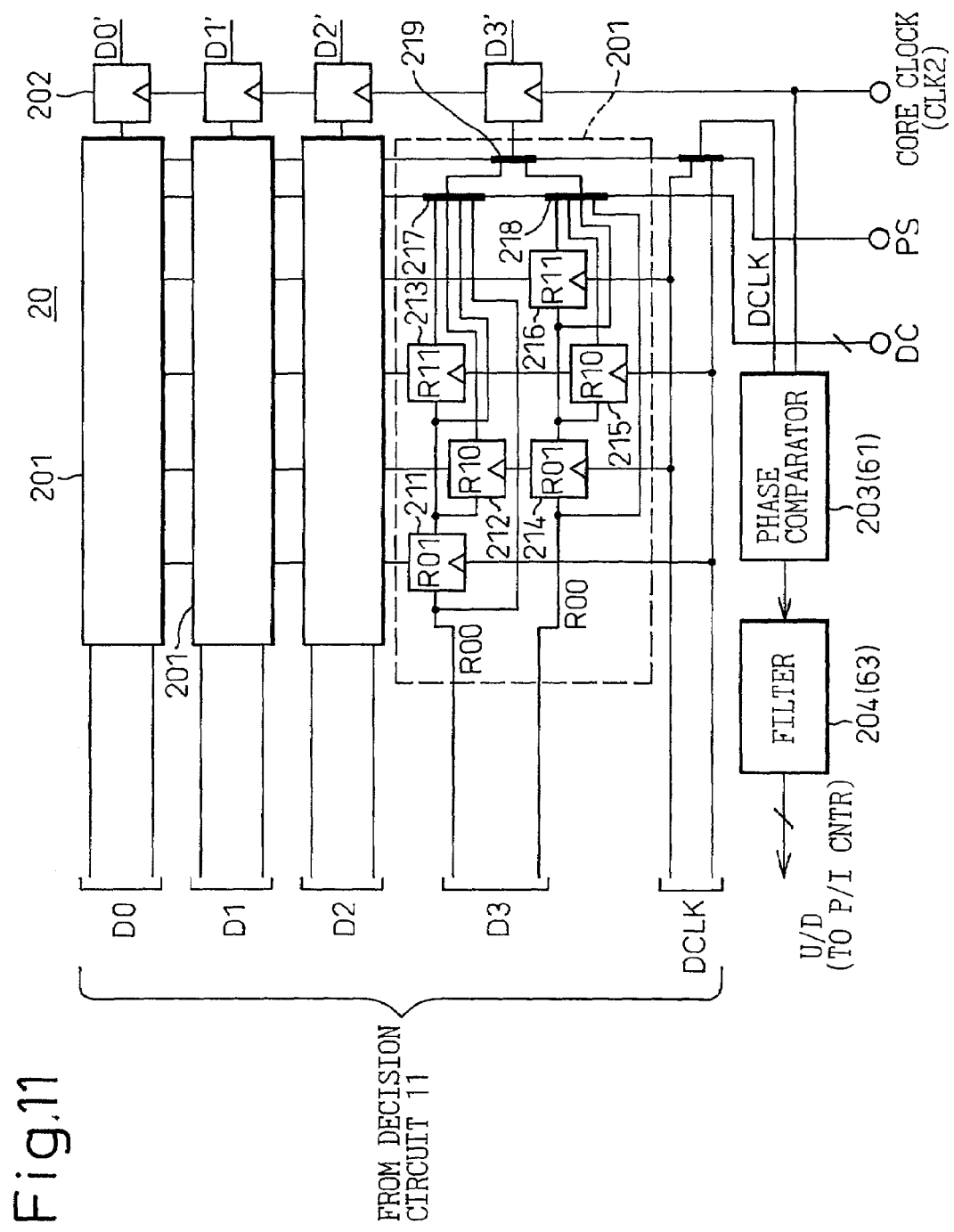
FIG. 11 is a block diagram of a synchronizer in the receiving circuit of FIG. 8.

FIG. 11 is a block diagram illustrating the synchronizer 20 in the receiving circuit of FIG. 8. In FIG. 11, reference numeral 201 denotes synchronizing units, 202 denotes registers (D-FFS), 203 denotes a phase comparator (phase detector), and 204 denotes a filter (digital filter).

Referring to FIG. 11, the synchronizer (latter half portion of the synchronizer) 20 receives data signals D0 to D3 and a data clock signal DCLK from the decision circuit 11, and receives a delay code DC, a pointer signal PS and a core clock signal (second clock signal CLK2) from the basic control circuit (BCTL unit) 90.

Each synchronizing unit 201 includes a plurality of registers (D-FFs) 211 to 216 and selectors 217 to 219. The output signal of the synchronizing unit 201 selected by the selector 219 is produced through a register 202 controlled by the core clock CLK2, thereby to obtain data signals D0' to D3' in synchronism with the core clocks CLK2.

Here, the selector 219 is controlled by the pointer signal PS from the basic control circuit 90, and selects signal paths of an odd number or an even number (outputs of the buffers 114o, 114e for odd paths or even paths) to produce the output. The selectors 217 and 218 are controlled by the delay code DC to select the number of stages of the registers depending upon the delay amount.

The phase comparator 203 (corresponding, for example, to the phase comparator 61 in FIG. 7) compares the phase of the data clock signal DCLK with the phase of the core clock CLK2, and supplies the output to the PI counter 30 through the filter 204 (corresponding, for example, to the filter 63 in FIG. 4). Then, the core clock (CLK2) becomes in phase with the data clock signal DCLK. As a result, a phase code value is determined (calibrated), which is in phase with the clock (DCLK) of the phase interpolator which has a particular phase relationship (corresponds to the time of clock-to-Q of D-FF) thereto.

Figure 12:
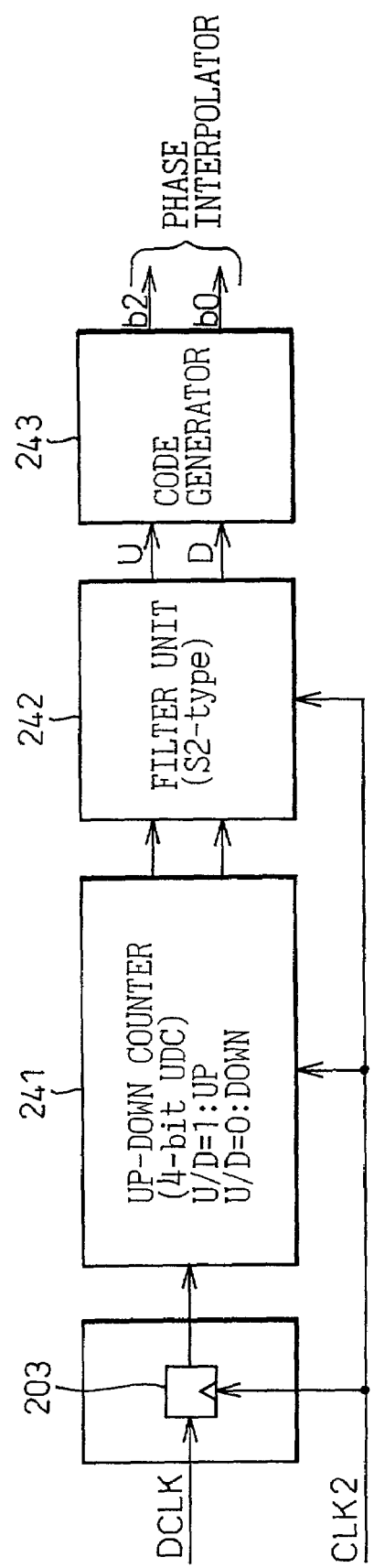
FIG. 12 is a block diagram illustrating a phase comparator and a filter in the synchronizer of FIG. 11.
Figure 13:
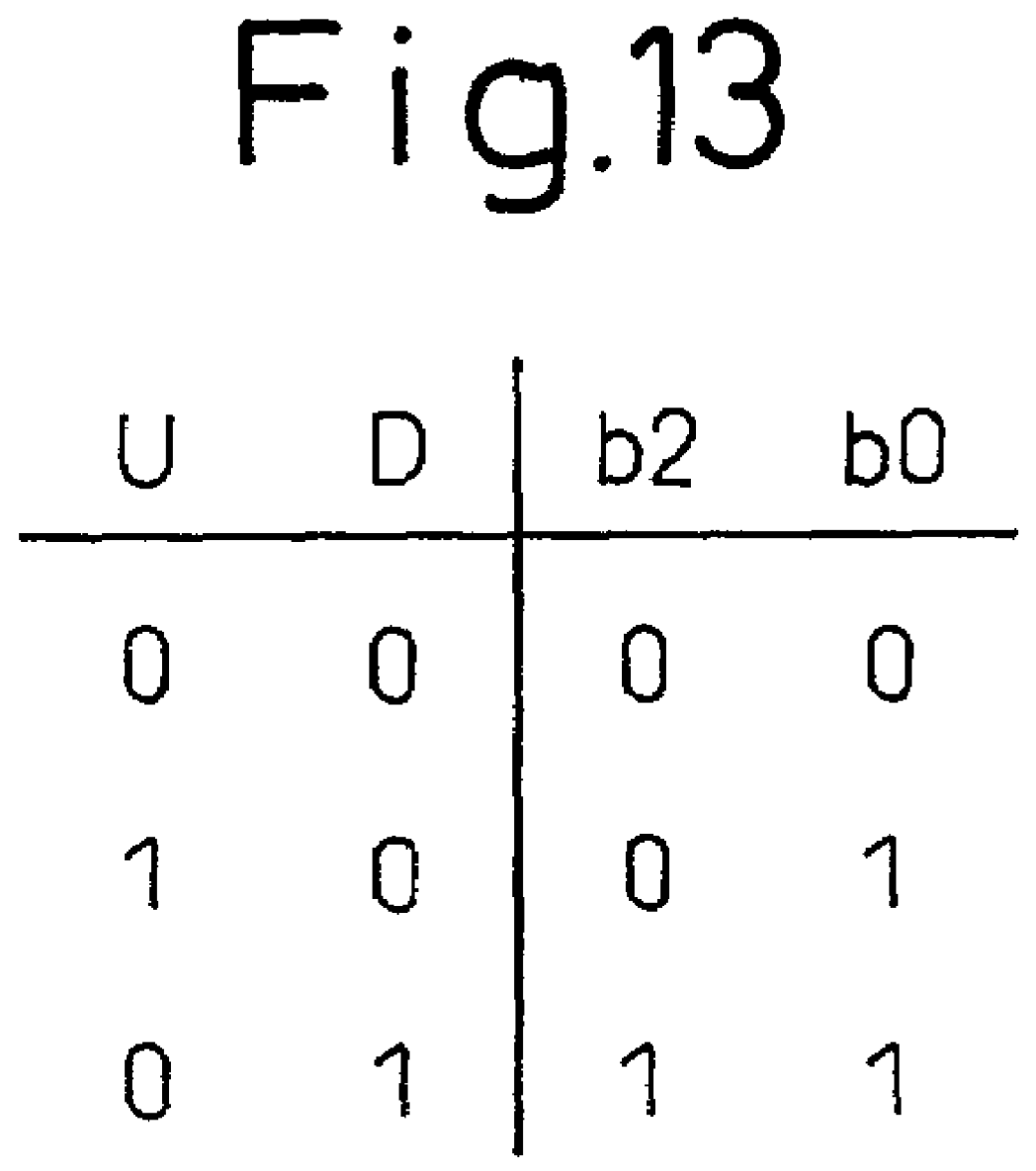

FIG. 12 is a block diagram illustrating a phase comparator (phase detecting circuit) 203 and the filter 204 in the synchronizer of FIG. 11, and FIG. 13 is a diagram illustrating the operation of the code generating circuit in the phase detecting circuit of FIG. 12.

Referring to FIG. 12, the phase comparator (phase detector) 203 is constituted as a register (D-FF) similar to the output register, and the filter 204 is so constituted as to include an up-down counter (e.g., 4-bit up-down counter) 241, a filter unit 242 and a code generator 243. The up-down counter 241 is controlled depending upon the difference of phase between the data clock signal DCLK and the core clock CLK2, and codes b2 and b0 of a truth table shown in FIG. 13 are output depending upon the outputs U and D of the filter 242.

Figure 14:
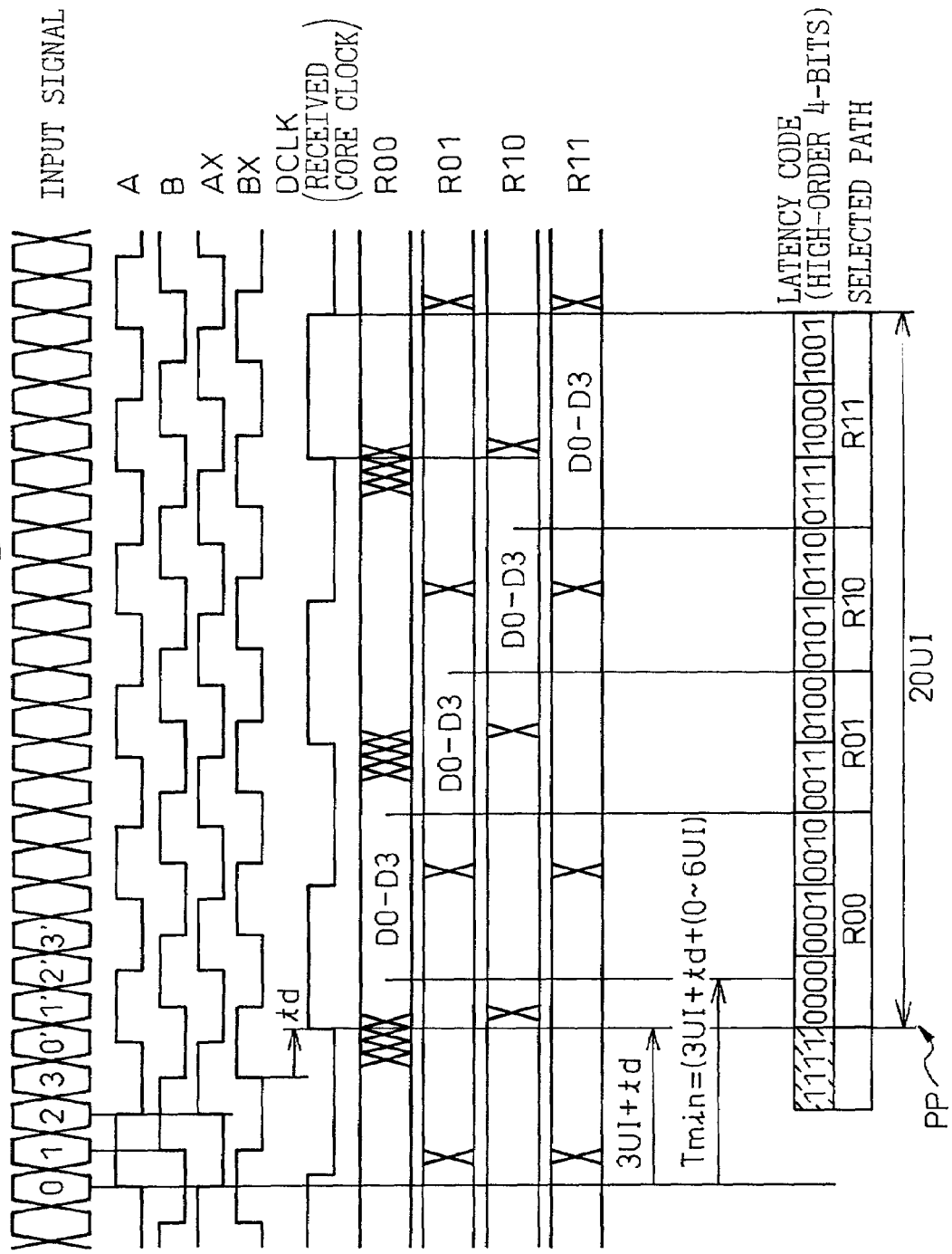
FIG. 14 is a timing diagram illustrating the operation of the synchronizer of FIG. 11.

FIG. 14 is a timing diagram illustrating the operation of the synchronizer of FIG. 11, i.e., illustrating the operation of signal paths of an even number. The same also holds for the signal paths of an odd number. In FIG. 14, reference code PP represents a timing from when a first clock "0" of the four bits that are input until when the latency for producing the 4-bit data in parallel becomes zero (3UI+td: where td is a delay of register), and Tmin represents a minimum reading time (3UI+td+(0 to 6UI): where 0 to 6UI are reading margins).

As described with reference to FIG. 9, the delay of data after the phase code is calibrated is learned from a value of the latency counter 97 in the basic control circuit (BCTL unit) 90. The delay code DC and the pointer signal PS are generated by using the value of the latency counter 97.

FIG. 14 shows high-order 4 bits of the latency code, and the selector (selector for signal paths of an even number in FIG. 11) 218 is controlled by the delay code DC. That is, when the latency codes of the high-order 4 bits are "0000", "0001" and "0010", the selector 218 of FIG. 11 selects a signal path R00 (which does not pass through the register). When the latency codes are "0011" and "0100", the selector 218 selects a signal path R01 (which passes through the register 214 only). When the latency codes are "0101" and "0110", the selector 218 selects a signal path R10 (passing through the registers 214 and 215). When the latency codes are "0111", "1000" and "1001", the selector 218 selects a signal path R11 (that passes through all registers 214 to 216).

Here, the pointer signal PS basically continues to toggle with "0101". As the delay of the synchronizer 20 increases (or decreases) in excess of a limit value, however, the pointer signal PS is controlled by the basic control circuit 90 so will not to be toggled (e.g., "0101011010 - - - " (" - - - 11 - - - ")) and, at the same time, the latency code is shifted by 4 UI (unit interval). The data at the time of shifting the latency code is not used but is discarded for inserting, for example, the data for compensation for every predetermined bits of the input signal (data signal transmitted to the receiving circuits). The data for compensation is constituted by 4 bits, the first code being a special code (null symbol).

The phase code is calibrated by giving an input signal "1000100010001 - - - " of a training pattern of a period of 4 bits at the time of closing the power source circuit. The delay code used by the synchronizer 20 is generated based upon the latency code like the one shown in FIG. 14.

Figure 15:
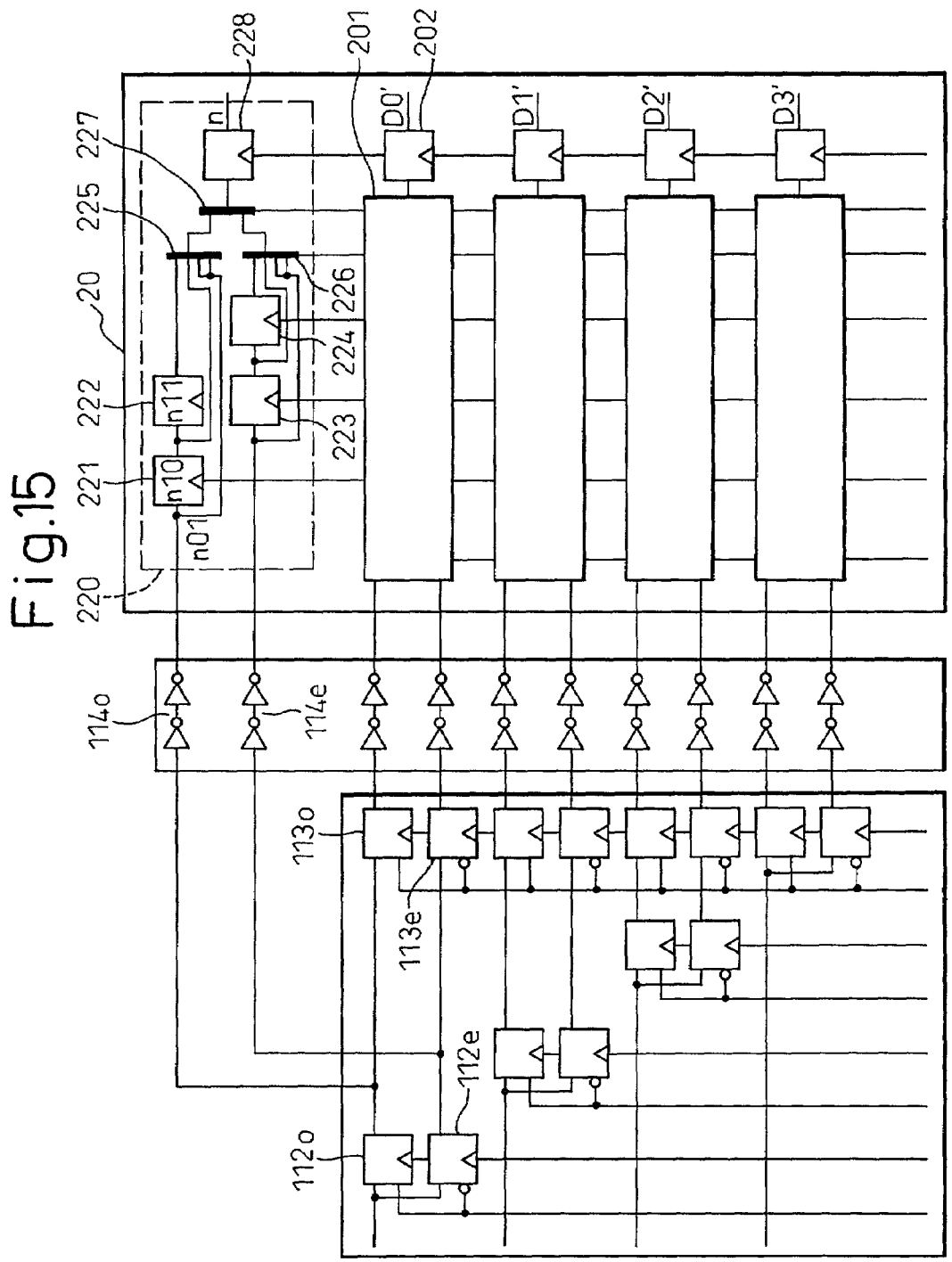
FIG. 15 is a block diagram illustrating a look-ahead special code generating unit in the receiving circuit of FIG. 8.

FIG. 15 is a block diagram illustrating a look-ahead special code generating unit in the receiving circuit of FIG. 8.

Referring to FIG. 15, the look-ahead special code generating unit 220 is constituted similarly to the synchronizing unit 201 shown in FIG. 11, and includes a plurality of registers (D-FFs) 221 to 224, selectors 225 to 227, and output registers (D-FFS) 228. That is, only those output signals of the first bit (registers 112$o$, 112$e$) of the 4-bit data serially sent to the receiving circuit, are supplied to the look-ahead special code generating unit 220 through the buffers 144$o$, 144$e$, and a special code (first one bit of the 4-bit compensation data) n is detected at a timing earlier (by about 3 UI) than the data D0 to D3 that are output in parallel.

Figure 16:
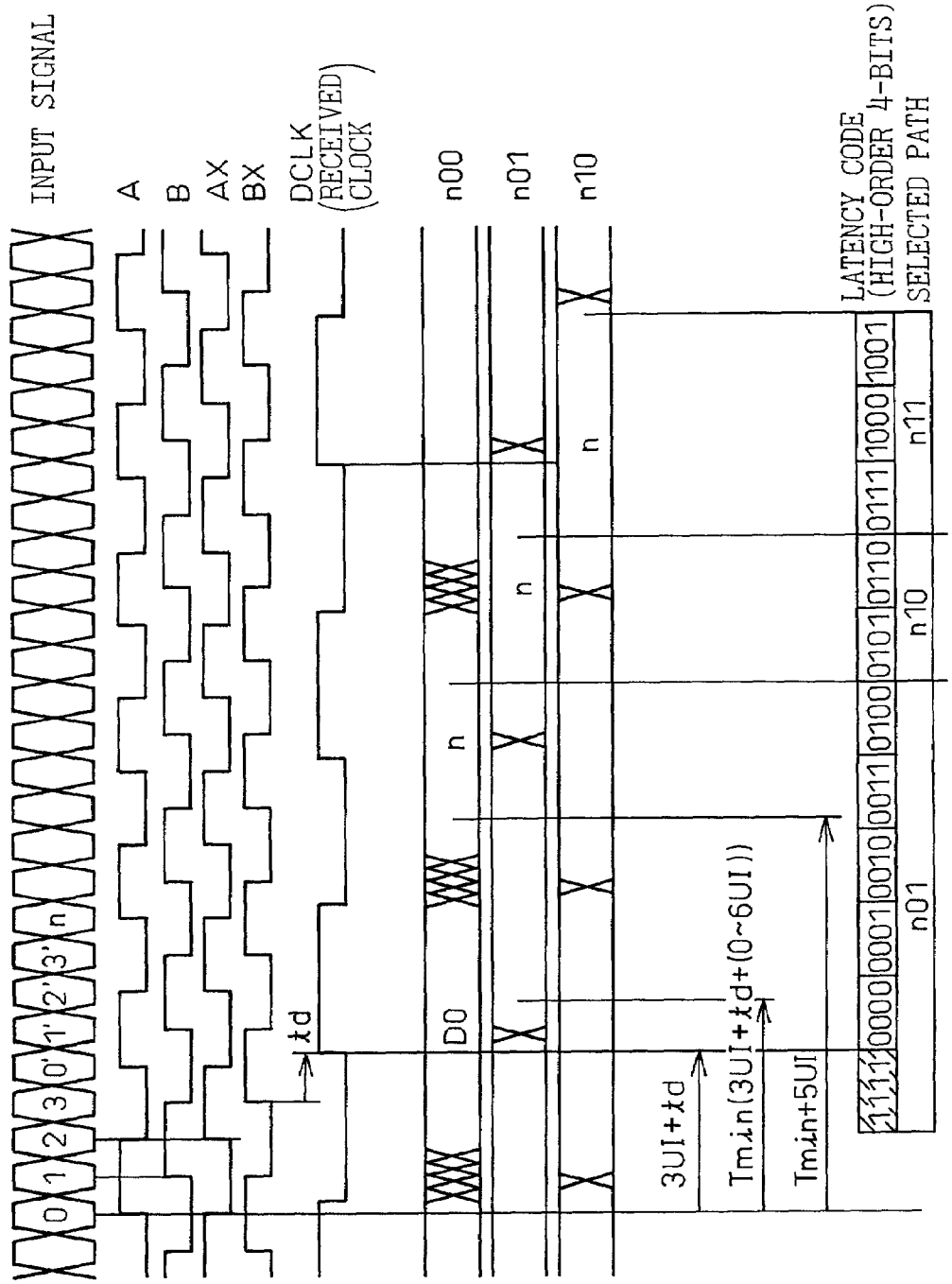
FIG. 16 is a timing diagram illustrating the operation of the synchronizer of FIG. 15.

FIG. 16 is a timing diagram for illustrating the operation of the synchronizer of FIG. 15.

As will become obvious from a comparison between FIG. 14 and FIG. 16, the look-ahead special code generating unit 220 in the synchronizer shown in FIG. 15 executes the operation similar to that of FIG. 11 to generate the delay code based upon the latency code. Upon confirming the above-mentioned special code (null symbol) earlier than the other data, the processing is executed relying upon the data for compensation.

FIG. 17 is a block diagram illustrating an interface circuit (PI control circuit) 30 between the phase interpolator 12 and the synchronizer 20 in the receiving circuit of FIG. 8.

Referring to FIG. 17, the interface circuit 30 includes a counter 301 and a selector 302, selects the outputs b2, b1 (=0) and b0 of the synchronizer 20 (output codes from the filter 204) and the codes b2', b1' and b0' from the basic control circuit 90 by using the selector 302 in response to the phase offset cancel signal POC, and supplies them to the counter 301. The phase code (gray code) counted by the counter 301 is supplied to the phase interpolator 12.

When the phase offset cancel signal POC is "1", the selector 302 selects the code from the synchronizer 20, whereby a local feedback loop is formed to calibrate the phase code. When the phase offset cancel signal POC is "0", an output code is selected from the basic control circuit 90 and is supplied to the counter 301.

FIG. 18 is a block diagram illustrating the phase interpolator 12 in the receiving circuit of FIG. 8.

Referring to FIG. 18, the phase interpolator 12 includes a code converter unit 121, a D/A converter 122, a phase interpolator core 123 and a frequency divider 124.

The code converter unit 121 converts a phase code (gray code) from the counter 301 (interface circuit 30) into a thermometer code and supplies it to the D/A converter 122. The D/A converter 122 converts the thermometer code that is supplied into an analog signal and supplies it to the phase interpolator core 123.

The phase interpolator core 123 includes a mixer and a comparator, weighs the 4-phase clock signals (e.g., 800 MHz) from, for example, the PLL circuit with the output of the D/A converter 122, and sends 2-phase clock signals (e.g., 800 MHz) having any phase to the frequency divider 124. The frequency divider 124 divides the frequency of the 2-phase clock signals that are input to generate 4-phase clock signals (two sets of complementary signals having phases different by 90 degrees) A, B, Ax, BX (e.g., 400 MHz) having phases different by 90 degrees from one another), and supplies the 4-phase clock signals to the decision circuit 11.

According to the present invention as described above in detail, it is possible to correctly learn a relationship of phase between the clock signals used for receiving high-speed signals and the clock signals for driving the internal circuit over the whole range of phases without operating the phase detecting circuit at all times. It is therefore made possible to realize a synchronizer with a small latency excluding the probability of metastable state. Accordingly, a timing signal generating system (receiving circuit) having a synchronizer is constituted using a decreased amount of circuitry and can be operated in a short time.

Many different embodiments of the present invention may be constructed without departing from the spirit and scope of the present invention, and it should be understood that the present invention is not limited to the specific embodiments described in this specification, except as defined in the appended claims.

What is claimed is:

1. A timing signal generating system comprising:
a clock signal generating circuit generating at least one first clock signal upon receipt of at least one reference clock signal by controlling an output phase thereof with a digital code signal;
a synchronizing circuit handing over signals between a group of circuits operated by said first clock signal and an internal circuit operated by a second clock signal;
a phase code recognizing circuit recognizing a phase code when the phases of said first clock signal and of said second clock signal are in a particular relationship; and
a calibration circuit calibrating a relationship between a value of said recognized phase code and a phase difference between said first and second clock signals, wherein said synchronizing circuit is controlled by using phase code data calibrated by said calibration circuit, wherein the phase code data from said calibration circuit and the phase difference between the first and second clock signals, are calibrated at the time of closing a power source circuit of an apparatus equipped with said timing signal generating system.

2. The timing signal generating system as claimed in claim 1, wherein a relationship of an integer number of times exists between a period of said second clock signal and a period of said reference clock signal.

3. The timing signal generating system as claimed in claim 1, wherein said clock signal generating circuit is a phase interpolator.

4. The timing signal generating system as claimed in claim 1, wherein said synchronizing circuit comprises:
a first D-type flip-flop driven by said first clock signal; and
a second D-type flip-flop latching a recurring signal output from said first D-type flip-flop being driven by said second clock signal.

5. A timing signal generating system comprising:
a clock signal generating circuit generating at least one first clock signal upon receipt of at least one reference clock signal by controlling an output phase thereof with a digital code signal;
a synchronizing circuit handing over signals between a group of circuits operated by said first clock signal and an internal circuit operated by a second clock signal;
a phase code recognizing circuit recognizing a phase code when the phases of said first clock signal and of said second clock signal are in a particular relationship; and
a calibration circuit calibrating a relationship between a value of said recognized phase code and a phase difference between said first and second clock signals, wherein said synchronizing circuit is controlled by using phase code data calibrated by said calibration circuit, wherein said synchronizing circuit comprises:
a selector driven by said first clock signal; and
a D-type flip-flop latching a recurring signal output from said selector being driven by said second clock signal.

6. A timing signal generating system comprising:
a clock signal generating circuit generating at least one first clock signal upon receipt of at least one reference clock signal by controlling an output phase thereof with a digital code signal;
a synchronizing circuit handing over signals between a group of circuits operated by said first clock signal and an internal circuit operated by a second clock signal;
a phase code recognizing circuit recognizing a phase code when the phases of said first clock signal and of said second clock signal are in a particular relationship;
a calibration circuit calibrating a relationship between a value of said recognized phase code and a phase difference between said first and second clock signals, wherein said synchronizing circuit is controlled by using phase code data calibrated by said calibration circuit;
a phase comparator comparing the phase of said first clock signal with the phase of said second clock signal; and
a feedback loop processing the output of said phase comparator and feeding it back to said phase code, wherein said phase code is recognized at the time when said feedback loop is operated to set the phase difference between said first and second clock signals to a predetermined value,
wherein said phase comparator comprises:
a first D-type flip-flop driven by said first clock signal; and
a second D-type flip-flop latching a recurring signal output from said first D-type flip-flop being driven by said second clock signal.

7. A timing signal generating system comprising:
a clock signal generating circuit generating at least one first clock signal upon receipt of at least one reference clock signal by controlling an output phase thereof with a digital code signal;
a synchronizing circuit handing over signals between a group of circuits operated by said first clock signal and an internal circuit operated by a second clock signal;
a phase code recognizing circuit recognizing a phase code when the phases of said first clock signal and of said second clock signal are in a particular relationship;
a calibration circuit calibrating a relationship between a value of said recognized phase code and a phase difference between said first and second clock signals, wherein said synchronizing circuit is controlled by using phase code data calibrated by said calibration circuit;
a phase comparator comparing the phase of said first clock signal with the phase of said second clock signal; and
a feedback loop processing the output of said phase comparator and feeding it back to said phase code, wherein said phase code is recognized at the time when said feedback loop is operated to set the phase difference between said first and second clock signals to a predetermined value, wherein said phase comparator comprises:
  a selector driven by said first clock signal; and
  a D-type flip-flop latching a recurring signal output from said selector being driven by said second clock signal.

8. A timing signal generating system comprising:
  a clock signal generating circuit generating at least one first clock signal upon receipt of at least one reference clock signal by controlling an output phase thereof with a digital code signal;
  a synchronizing circuit handing over signals between a group of circuits operated by said first clock signal and an internal circuit operated by a second clock signal;
  a phase code recognizing circuit recognizing a phase code when the phases of said first clock signal and of said second clock signal are in a particular relationship; and
  a calibration circuit calibrating a relationship between a value of said recognized phase code and a phase difference between said first and second clock signals, wherein said synchronizing circuit is controlled by using phase code data calibrated by said calibration circuit, wherein said calibration circuit comprises a counter which is reset to zero at a time when the phase difference between said first and second clock signals assumes a predetermined value and, then, changes in the same manner as said phase code.

9. The timing signal generating system as claimed in claim 8, wherein said synchronizing circuit is constituted by a circuit equivalent to FIFO, and a value of a read pointer of said FIFO is determined by using a value of a write pointer of said FIFO and by using a value of said phase code.

10. A timing signal generating system comprising:
  a clock signal generating circuit generating at least one first clock signal upon receipt of at least one reference clock signal by controlling an output phase thereof with a digital code signal;
  a synchronizing circuit handing over signals between a group of circuits operated by said first clock signal and an internal circuit operated by a second clock signal;
  a phase code recognizing circuit recognizing a phase code when the phases of said first clock signal and of said second clock signal are in a particular relationship; and
  a calibration circuit calibrating a relationship between a value of said recognized phase code and a phase difference between said first and second clock signals, wherein said synchronizing circuit is controlled by using phase code data calibrated by said calibration circuit, wherein said calibration circuit comprises a storage circuit storing, as an offset value, a value of the phase code of when the phase difference between said first and second clock signals has assumed a predetermined value.

11. The timing signal generating system as claimed in claim 10, wherein said synchronizing circuit is constituted by a circuit equivalent to FIFO, and a value of a read pointer of said FIFO is determined by using a value of a write pointer of said FIFO and by using a value of said phase code.

12. A receiver circuit reproducing a clock signal from an input signal and reading data of said input signal by using said reproduced clock signal, comprising:
  a clock signal generating circuit generating at least one first clock signal upon receipt of at least one reference clock signal by controlling an output phase thereof with a digital code signal;
  a synchronizing circuit handing over signals between a group of circuits operated by said first clock signal and an internal circuit operated by a second clock signal;
  a phase code recognizing circuit recognizing a phase code when the phases of said first clock signal and of said second clock signal are in a particular relationship; and
  a calibration circuit calibrating a relationship between a value of said recognized phase code and a phase difference between said first and second clock signals, wherein said synchronizing circuit is controlled by using phase code data calibrated by said calibration circuit, wherein
  said group of circuits operated by said first clock signal comprises a data detecting circuit detecting data from said input signal, and a clock detecting circuit reproducing clocks from said input signal; and
  said internal circuit operated by said second clock signal comprises a basic control circuit controlling said clock signal generating circuit.

13. The receiver circuit as claimed in claim 12, wherein said data detecting circuit comprises a plurality of data detecting units driven by a group of the first clock signals, and said clock detecting circuit comprises a plurality of clock detecting units driven by a group of second clock signals having a predetermined phase difference from the group of said first clock signals.

14. The receiver circuit as claimed in claim 12, wherein said data detecting circuit and said clock detecting circuit comprise a first group of signal paths and a second group of signal paths, and select signal paths of either said first group or said second group depending upon a point control signal.

15. The receiver circuit as claimed in claim 12, wherein a relationship of an integer number of times exists between a period of said second clock signal and a period of said reference clock signal.

16. The receiver circuit as claimed in claim 12, wherein said clock signal generating circuit is a phase interpolator.

17. The receiver circuit as claimed in claim 12, wherein said synchronizing circuit comprises:
  a first D-type flip-flop driven by said first clock signal; and
  a second D-type flip-flop latching recurring signal output from said first D-type flip-flop being driven by said second clock signal.

18. A receiver circuit reproducing a clock signal from an input signal and reading data of said input signal by using said reproduced clock signal, the receiver circuit comprising:
  a clock signal generating circuit generating at least one first clock signal upon receipt of at least one reference clock signal by controlling an output phase thereof with a digital code signal;
  a synchronizing circuit handing over signals between a group of circuits operated by said first clock signal and an internal circuit operated by a second clock signal;
  a phase code recognizing circuit recognizing a phase code when the phases of said first clock signal and of said second clock signal are in a particular relationship; and
  a calibration circuit calibrating a relationship between a value of said recognized phase code and a phase difference between said first and second clock signals, wherein said synchronizing circuit is controlled by using phase code data calibrated by said calibration circuit, wherein the phase code data by said calibration circuit and the phase difference between the first and second clock signals, are calibrated at the time of closing a power source circuit of an apparatus equipped with said receiving circuit.

19. A receiver circuit reproducing a clock signal from an input signal and reading data of said input signal by using said reproduced clock signal, the receiver circuit comprising:
a clock signal generating circuit generating at least one first clock signal upon receipt of at least one reference clock signal by controlling an output phase thereof with a digital code signal;
a synchronizing circuit handing over signals between a group of circuits operated by said first clock signal and an internal circuit operated by a second clock signal;
a phase code recognizing circuit recognizing a phase code when the phases of said first clock signal and of said second clock signal are in a particular relationship; and
a calibration circuit calibrating a relationship between a value of said recognized phase code and a phase difference between said first and second clock signals, wherein said synchronizing circuit is controlled by using phase code data calibrated by said calibration circuit, wherein said synchronizing circuit comprises:
a selector driven by said first clock signal; and
a D-type flip-flop latching recurring signal output from said selector being driven by said second clock signal.

20. A receiver circuit reproducing a clock signal from an input signal and reading data of said input signal by using said reproduced clock signal, the receiver circuit comprising:
a clock signal generating circuit generating at least one first clock signal upon receipt of at least one reference clock signal by controlling an output phase thereof with a digital code signal;
a synchronizing circuit handing over signals between a group of circuits operated by said first clock signal and an internal circuit operated by a second clock signal;
a phase code recognizing circuit recognizing a phase code when the phases of said first clock signal and of said second clock signal are in a particular relationship;
a calibration circuit calibrating a relationship between a value of said recognized phase code and a phase difference between said first and second clock signals, wherein said synchronizing circuit is controlled by using phase code data calibrated by said calibration circuit;
a phase comparator comparing the phase of said first clock signal with the phase of said second clock signal; and
a feedback loop processing the output of said phase comparator and feeding it back to said phase code, wherein said phase code is recognized at the time when said feedback loop is operated to set the phase difference between said first and second clock signals to a predetermined value, wherein said phase comparator comprises:
a first D-type flip-flop driven by said first clock signal; and
a second D-type flip-flop latching recurring signal output from said first D-type flip-flop being driven by said second clock signal.

21. A receiver circuit reproducing a clock signal from an input signal and reading data of said input signal by using said reproduced clock signal, the receiver circuit comprising:
a clock signal generating circuit generating at least one first clock signal upon receipt of at least one reference clock signal by controlling an output phase thereof with a digital code signal;
a synchronizing circuit handing over signals between a group of circuits operated by said first clock signal and an internal circuit operated by a second clock signal;
a phase code recognizing circuit recognizing a phase code when the phases of said first clock signal and of said second clock signal are in a particular relationship;
a calibration circuit calibrating a relationship between a value of said recognized phase code and a phase difference between said first and second clock signals, wherein said synchronizing circuit is controlled by using phase code data calibrated by said calibration circuit;
a phase comparator comparing the phase of said first clock signal with the phase of said second clock signal; and
a feedback loop processing the output of said phase comparator and feeding it back to said phase code, wherein said phase code is recognized at the time when said feedback loop is operated to set the phase difference between said first and second clock signals to a predetermined value, wherein said phase comparator comprises:
a selector driven by said first clock signal; and
a D-type flip-flop latching recurring signal output from said selector being driven by said second clock signal.

22. A receiver circuit reproducing a clock signal from an input signal and reading data of said input signal by using said reproduced clock signal, the receiver circuit comprising:
a clock signal generating circuit generating at least one first clock signal upon receipt of at least one reference clock signal by controlling an output phase thereof with a digital code signal;
a synchronizing circuit handing over signals between a group of circuits operated by said first clock signal and an internal circuit operated by a second clock signal;
a phase code recognizing circuit recognizing a phase code when the phases of said first clock signal and of said second clock signal are in a particular relationship; and
a calibration circuit calibrating a relationship between a value of said recognized phase code and a phase difference between said first and second clock signals, wherein said synchronizing circuit is controlled by using phase code data calibrated by said calibration circuit, wherein said calibration circuit comprises a counter which is reset to zero at a timing when the phase difference between said first and second clock signals assumes a predetermined value and, then, changes in the same manner as said phase code.

23. The receiver circuit as claimed in claim 22, wherein said synchronizing circuit is constituted by a circuit equivalent to FIFO, and a value of a read pointer of said FIFO is determined by using a value of a write pointer of said FIFO and by using a value of said phase code.

24. A receiver circuit reproducing a clock signal from an input signal and reading data of said input signal by using said reproduced clock signal, the receiver circuit comprising:
a clock signal generating circuit generating at least one first clock signal upon receipt of at least one reference clock signal by controlling an output phase thereof with a digital code signal;
a synchronizing circuit handing over signals between a group of circuits operated by said first clock signal and an internal circuit operated by a second clock signal;

a phase code recognizing circuit recognizing a phase code when the phases of said first clock signal and of said second clock signal are in a particular relationship; and a calibration circuit calibrating a relationship between a value of said recognized phase code and a phase difference between said first and second clock signals, wherein said synchronizing circuit is controlled by using phase code data calibrated by said calibration circuit, wherein said calibration circuit comprises a storage circuit storing, as an offset value, a value of the phase code of when the phase difference between said first and second clock signals has assumed a predetermined value.

25. The receiver circuit as claimed in claim 24, wherein said synchronizing circuit is constituted by a circuit equivalent to FIFO, and a value of a read pointer of said FIFO is determined by using a value of a write pointer of said FIFO and by using a value of said phase code.

* * * * *